US011804012B1

(12) United States Patent
Kovacs et al.

(10) Patent No.: US 11,804,012 B1
(45) Date of Patent: Oct. 31, 2023

(54) METHOD AND DEVICE FOR NAVIGATION MESH EXPLORATION

(71) Applicant: Apple Inc., Cupertino, CA (US)

(72) Inventors: Daniel Laszlo Kovacs, Santa Clara, CA (US); Payal Jotwani, Santa Clara, CA (US); Dan Feng, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 232 days.

(21) Appl. No.: 17/323,799

(22) Filed: May 18, 2021

Related U.S. Application Data

(60) Provisional application No. 63/035,785, filed on Jun. 7, 2020.

(51) Int. Cl.
*G06T 19/00* (2011.01)
*G06T 17/20* (2006.01)

(52) U.S. Cl.
CPC ............ *G06T 19/003* (2013.01); *G06T 17/20* (2013.01)

(58) Field of Classification Search
CPC ....... G06T 19/006; G06T 17/20; G06T 17/00; G06T 19/003
See application file for complete search history.

(56) References Cited

U.S. PATENT DOCUMENTS

| 10,792,568 B1 * | 10/2020 | Merrill ..................... A63F 13/56 |
| 2013/0222371 A1 * | 8/2013 | Reitan ................... G06T 19/006 345/419 |
| 2020/0104522 A1 * | 4/2020 | Collart ................ G06F 21/6218 |

FOREIGN PATENT DOCUMENTS

WO WO-2005091198 A1 * 9/2005 ............. A63F 13/10

OTHER PUBLICATIONS

Julien Ceipek, "Game Path Planning," The Oliner's Guide to Programming Concepts, Retrieved from the Internet Jan. 11, 2020: http://jceipek.com/Olin-Coding-Tutorials/pathing.html, pp. 1-14.
Xiao Cui et al., "An Overview of Pathfinding in Navigation Mesh," IJCSNS International Journal of Computer Science and Network Security, vol. 12, No. 12, Dec. 2012, pp. 48-51.
Leonel Deusdado et al., "Path Planning for Complex 3D Multilevel Environments," Proceedings of the 24th Spring Conference on Computer Graphics, 2008, pp. 187-194.

(Continued)

*Primary Examiner* — Michelle Chin
(74) *Attorney, Agent, or Firm* — Fernando & Partners, LLP

(57) ABSTRACT

In some implementations, a method of navigation mesh exploration is performed at a virtual agent operating system. The method includes: determining one or more first sensory perception regions for one or more senses of a virtual agent based on a first perceptual vector associated with the virtual agent; generating a first portion of a navigation mesh for the XR environment based on the one or more first sensory perception regions, wherein the first portion of the navigation mesh includes candidate subsequent locations different from the first location; and in response to detecting movement of the virtual agent to a respective candidate subsequent location among candidate subsequent locations, generating a second portion of the navigation mesh for the XR environment based on one or more second sensory perception regions for the one or more senses of the virtual agent relative to the respective candidate subsequent location.

20 Claims, 15 Drawing Sheets

(56) References Cited

OTHER PUBLICATIONS

Marcelo Kallmann et al., "Navigation Meshes and Real-Time Dynamic Planning for Virtual Worlds," ACM SIGGRAPH 2014 Courses, 2014, pp. 1-18.

Wouter Van Toll et al., "A Comparative Study of Navigation Meshes," Proceedings of the 9th International Conference on Motion in Games, 2016, pp. 91-100.

Wouter Van Toll et al., "Navigation Meshes for Realistic Multi-Layered Environments," 2011 IEEE/RSJ International Conference on Intelligent Robots and Systems, 2011, pp. 3526-3532.

Unreal Engine, "Navigation Mesh Reference," Retrieved from the Internet on Mar. 18, 2021: https://docs.unrealengine.com/udk/Three/NavigationMeshReference.html, pp. 1-10.

Valve Developer Community, "Navigation Meshes," Retrieved from the Internet on Mar. 18, 2021: https://developer.valvesoftware.com/wiki/Navigation_Meshes, pp. 1-22.

MIIMII1205, "Navigation Meshes and Pathfinding," Apr. 27, 2018, Retrieved from the Internet on Mar. 18, 2021: https://www.gamedev.net/tutorials/programming/artificial-intelligence/navigation-meshes-and-pathfinding-r4880/, pp. 1-8.

"A* Pathfinding Project,", Retrieved from the Internet on Mar. 18, 2021: https://arongranberg.com/astar/, pp. 1-7.

* cited by examiner

Navigation Mesh 730

Walkable Environment 720

Mono-Planar, Multi-Layer 3D Environment 710

METHOD AND DEVICE FOR NAVIGATION MESH EXPLORATION

TECHNICAL FIELD

The present disclosure generally relates to navigation meshes, and in particular, to systems, methods, and devices for navigation mesh exploration.

BACKGROUND

Typically, a search algorithm, such as A* or Dijkstra, is performed to plot a path through an environment from point A to point B based on a navigation mesh that characterizes the navigable area of the environment. However, this assumes that the virtual agent (or its orchestrator) has a priori knowledge of its environment in the form of a fully built navigation mesh.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
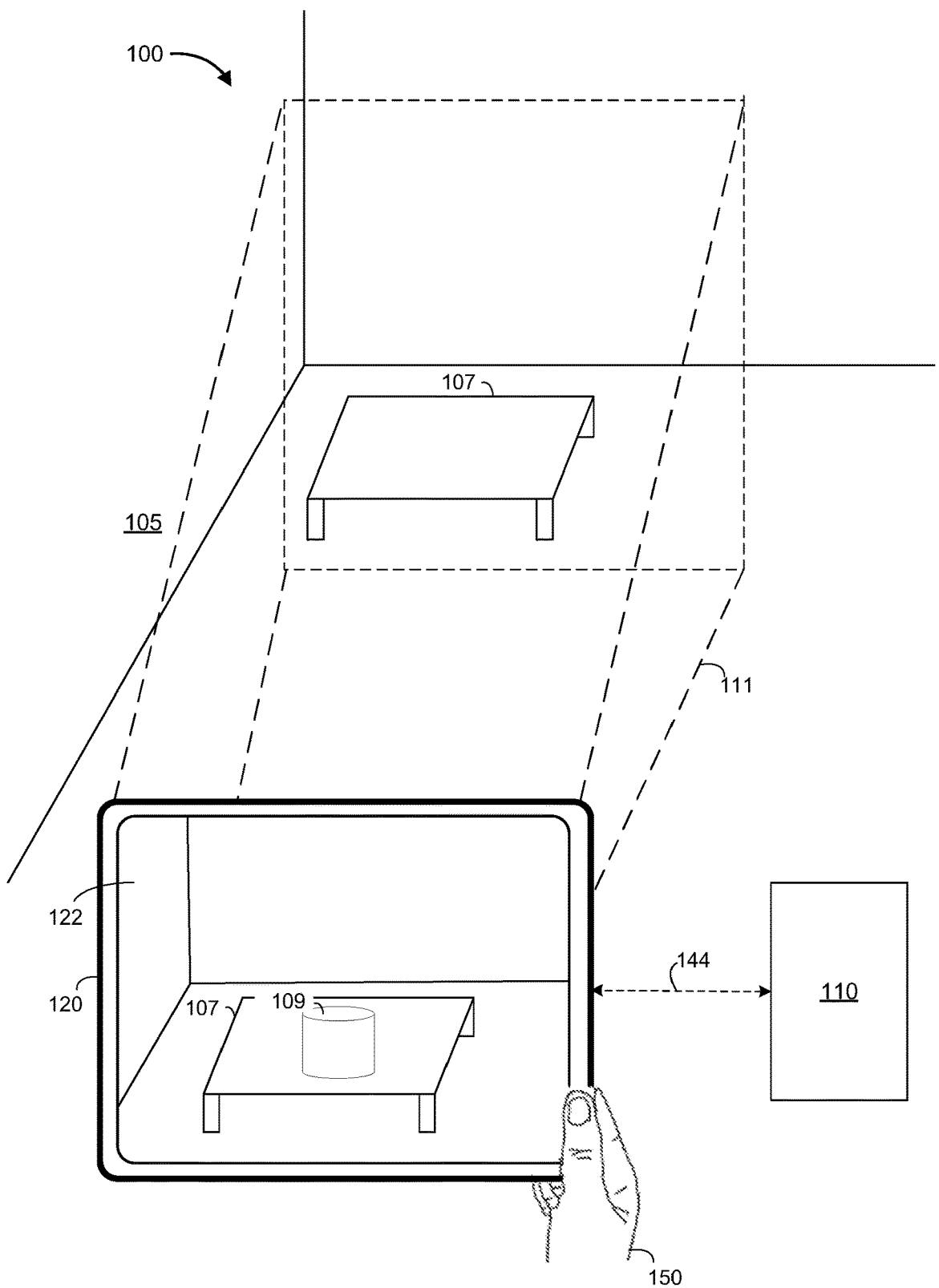
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for navigation mesh exploration. According to some implementations, the method is performed at a virtual agent operating system including non-transitory memory and one or more processors coupled with the non-transitory memory. The method includes: determining one or more first sensory perception regions for one or more senses of a virtual agent based on a first perceptual vector associated with the virtual agent, wherein the first perceptual vector includes first translational coordinates associated with a first location of the virtual agent within an extended reality (XR) environment, first rotational coordinates of the virtual agent, and a sensory acuity profile associated with the virtual agent; generating a first portion of a navigation mesh for the XR environment based on the one or more first sensory perception regions, wherein the first portion of the navigation mesh includes one or more candidate subsequent locations different from the first location; and in response to detecting movement of the virtual agent to a respective candidate subsequent location among the one or more candidate subsequent locations, generating a second portion of the navigation mesh for the XR environment based on one or more second sensory perception regions for the one or more senses of the virtual agent relative to the respective candidate subsequent location.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
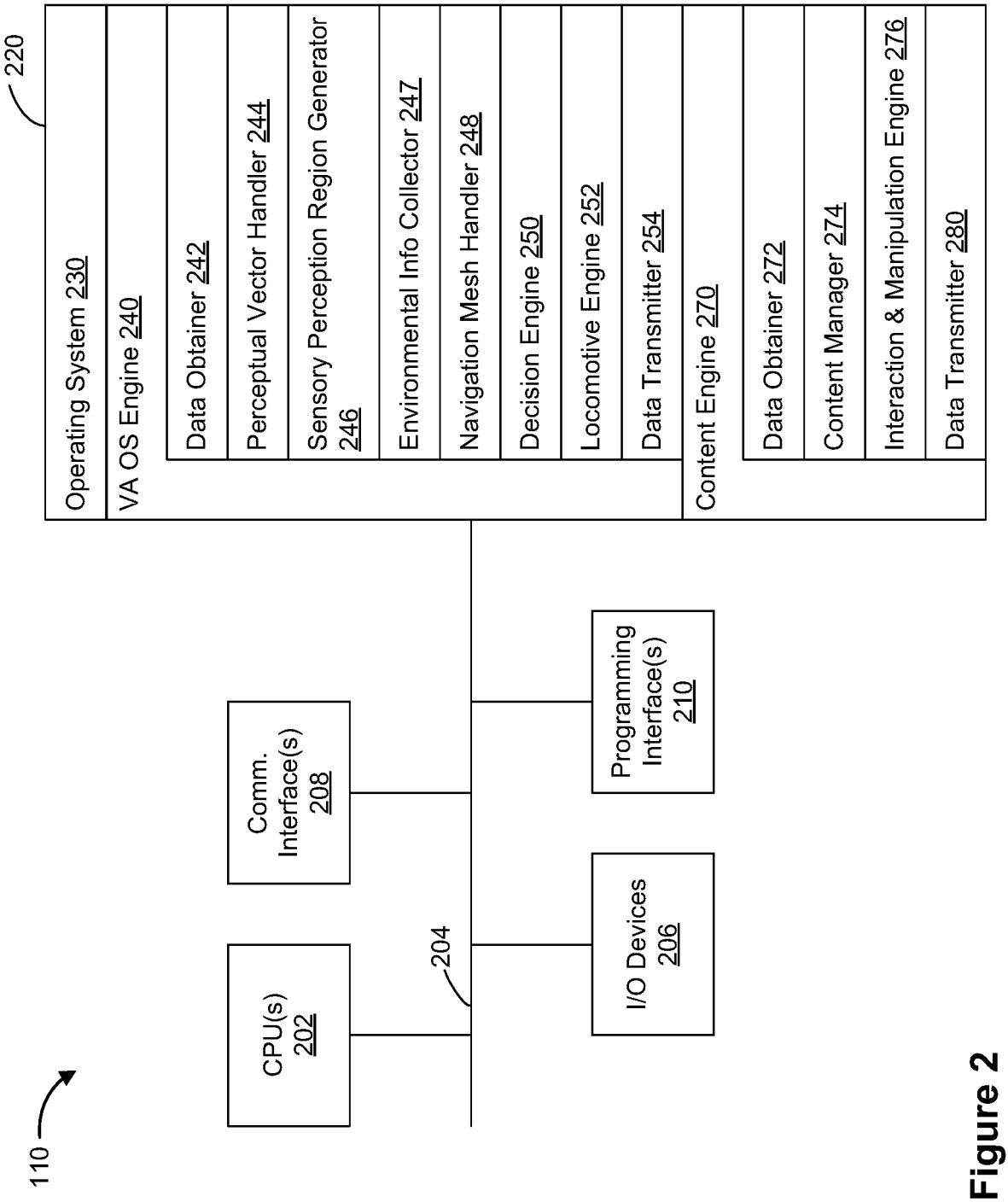
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a virtual agent (VA) operating system (OS) engine 240, and a content engine 270.

The operating system 230 includes procedures for handling various basic system services and for performing hardware dependent tasks.

In some implementations, the VA OS engine 240 is configured to manage, handle, and drive one or more VAs within an XR environment. For example, the one or more VAs may correspond to bipedal humanoids or the like that are restricted by gravity and maintain contact with a planar surface of the XR environment such as the floor. In another example, the one or more VAs may correspond to other entities, such as a spider, that are unrestricted (or partially restricted) by gravity and maintain contact with a planar surface of the XR environment such as the floor, walls, or ceiling. In another example, the one or more VAs may correspond to various other entities, such as a flying insect, that are able to navigate the XR environment as a volumetric 3D space. To that end, in some implementations, the VA OS engine 240 includes a data obtainer 242, a perceptual vector handler 244, a sensory perception region generator 246, an environmental information collector 247, a navigation mesh handler 248, a decision engine 250, a locomotive engine 252, and a data transmitter 254.

In some implementations, the data obtainer 242 is configured to obtain data (e.g., a target destination/objective for the VA, navigation information, sensory information, environmental information, VA movement information, input data, location data, etc.) from at least one of the I/O devices 206 of the controller 110, the electronic device 120, and the optional remote input devices. As one example, in some implementations, the data obtainer 242 obtains a target destination/objective for the VA based on one or more user inputs, one or more user preferences, and/or the like. As another example, the virtual agent operating system intelligently or pseudo-randomly selects the destination/objective from a predefined set of available destination/objectives for the XR environment or the like. To that end, in various implementations, the data obtainer 242 includes instructions and/or logic therefor, and heuristics and metadata therefor.

In some implementations, the perceptual vector handler 244 is configured to manage (e.g., generate, update, etc.) a perceptual vector for the VA within the XR environment based on sensory information obtained by the VA relative to its current locations. An example perceptual vector 404 is described in more detail below with reference to FIG. 5A. To that end, in various implementations, the perceptual vector handler 244 includes instructions and/or logic therefor, and heuristics and metadata therefor.

In some implementations, the sensory perception region generator 246 is configured to generate one or more sensory perception regions for the VA within the XR environment based on their associated perceptual vector. For example, the one or more sensory perception regions correspond to representation(s) or visualization(s) of the perceptual capabilities or bounds of the VA. As such, in one example, the one or more sensory perception regions for a particular VA corresponds to a viewing frustum, an aural perception region, an olfactory perception region, and/or the like. Example sensory perception regions are described in more detail below with reference to FIGS. 6A-6C. To that end, in various implementations, the sensory perception region generator 246 includes instructions and/or logic therefor, and heuristics and metadata therefor.

In some implementations, the environmental information collector 247 is configured to obtain an environmental information vector associated with the one or more sensory perception regions that characterizes the XR environment from the current location of the VA. In some implementations, the environmental information vector is obtained by performing object recognition, semantic segmentation, simultaneous localization and mapping (SLAM), and/or the like on the one or more sensory perception regions of the XR environment. An example environmental information vector 408 is described in more detail below with reference to FIG. 5A. To that end, in various implementations, the environmental information collector 247 includes instructions and/or logic therefor, and heuristics and metadata therefor.

In some implementations, the navigation mesh handler 248 is configured to generate a navigation mesh (or a portion thereof) for the XR environment based on the locomotive profile for the VA and the environmental information vector associated with the one or more sensory perception regions by using one or more techniques known in the art such as local clearance triangulation, explicit corridor map, clearance disk graph, recast, NEOGEN, and/or the like. In some implementations, the navigation mesh handler 248 is configured to update (e.g., merge, expand, collapse, etc.) the navigation mesh for the XR environmental information as the VA moves about the XR environment collecting additional environmental characterizing newly explored portions of the XR environment. An example locomotive profile 560 is described in more detail below with reference to FIG. 5B. To that end, in various implementations, the navigation mesh handler 248 includes instructions and/or logic therefor, and heuristics and metadata therefor.

In some implementations, the decision engine 250 is configured to determine one or more candidate subsequent locations for the VA based on the current navigation mesh for the XR environment. In some implementations, the decision engine 250 is also configured to select a subsequent location for the VA from the or more candidate subsequent locations based on the target destination/objective for the VA (e.g., build-out the navigation mesh for the XR environment). As one example, the subsequent location is the selected in order to explore the XR environment more quickly or build-out the navigation mesh for the XR environment. As one example, the subsequent location is the selected in order to reach the target destination more quickly or achieve the objective. To that end, in various implementations, the decision engine 250 includes instructions and/or logic therefor, and heuristics and metadata therefor.

In some implementations, the locomotive engine 252 is configured to actuate one or more locomotive elements (e.g., joints, limbs, etc.) of the VA based on a locomotive profile for the VA in order to move the virtual agent to the subsequent location within the XR environment. An example locomotive profile 560 is described in more detail below with reference to FIG. 5B. To that end, in various implementations, the locomotive engine 252 includes instructions and/or logic therefor, and heuristics and metadata therefor.

In some implementations, the data transmitter 254 is configured to transmit data (e.g., environmental information, VA location information, VA movement information, etc.) to at least the electronic device 120 or the content engine 270. To that end, in various implementations, the data transmitter 254 includes instructions and/or logic therefor, and heuristics and metadata therefor.

Although the data obtainer 242, the perceptual vector handler 244, the sensory perception region generator 246, the environmental information collector 247, the navigation mesh handler 248, the decision engine 250, a locomotive engine 252, and the data transmitter 254 are shown as residing on a single device (e.g., the controller 110), it should be understood that in other implementations, any combination of the perceptual vector handler 244, the sensory perception region generator 246, the environmental information collector 247, the navigation mesh handler 248, the decision engine 250, a locomotive engine 252, and the data transmitter 254 may be located in separate computing devices.

In some implementations, the content engine 270 is configured to manage, handle, and update the XR environment and the objects therein. To that end, in some implementations, the content engine 270 includes a data obtainer 272, a content manager 274, an interaction and manipulation engine 276, and a data transmitter 280.

In some implementations, the data obtainer 272 is configured to obtain data (e.g., presentation data, input data, user interaction data, head tracking information, camera pose tracking information, eye tracking information, sensor data, location data, etc.) from at least one of the I/O devices 206 of the controller 110, the electronic device 120, and the optional remote input devices. To that end, in various implementations, the data obtainer 272 includes instructions and/or logic therefor, and heuristics and metadata therefor.

In some implementations, the content manager 274 is configured to generate (i.e., render), manage, and modify an XR environment presented to a user. To that end, in various implementations, the content manager 274 includes instructions and/or logic therefor, and heuristics and metadata therefor.

In some implementations, the interaction and manipulation engine 276 is configured to interpret user interactions and/or modification inputs directed to the XR environment and XR objects therein. To that end, in various implementations, the interaction and manipulation engine 276 includes instructions and/or logic therefor, and heuristics and metadata therefor.

In some implementations, the data transmitter 280 is configured to transmit data (e.g., presentation data such as rendered image frames associated with the XR environment, location data, etc.) to at least the electronic device 120. To that end, in various implementations, the data transmitter 280 includes instructions and/or logic therefor, and heuristics and metadata therefor.

Although the data obtainer 272, the content manager 274, the interaction and manipulation engine 276, and the data transmitter 280 are shown as residing on a single device (e.g., the controller 110), it should be understood that in other implementations, any combination of the data obtainer 272, the content manager 274, the interaction and manipulation engine 276, and the data transmitter 280 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
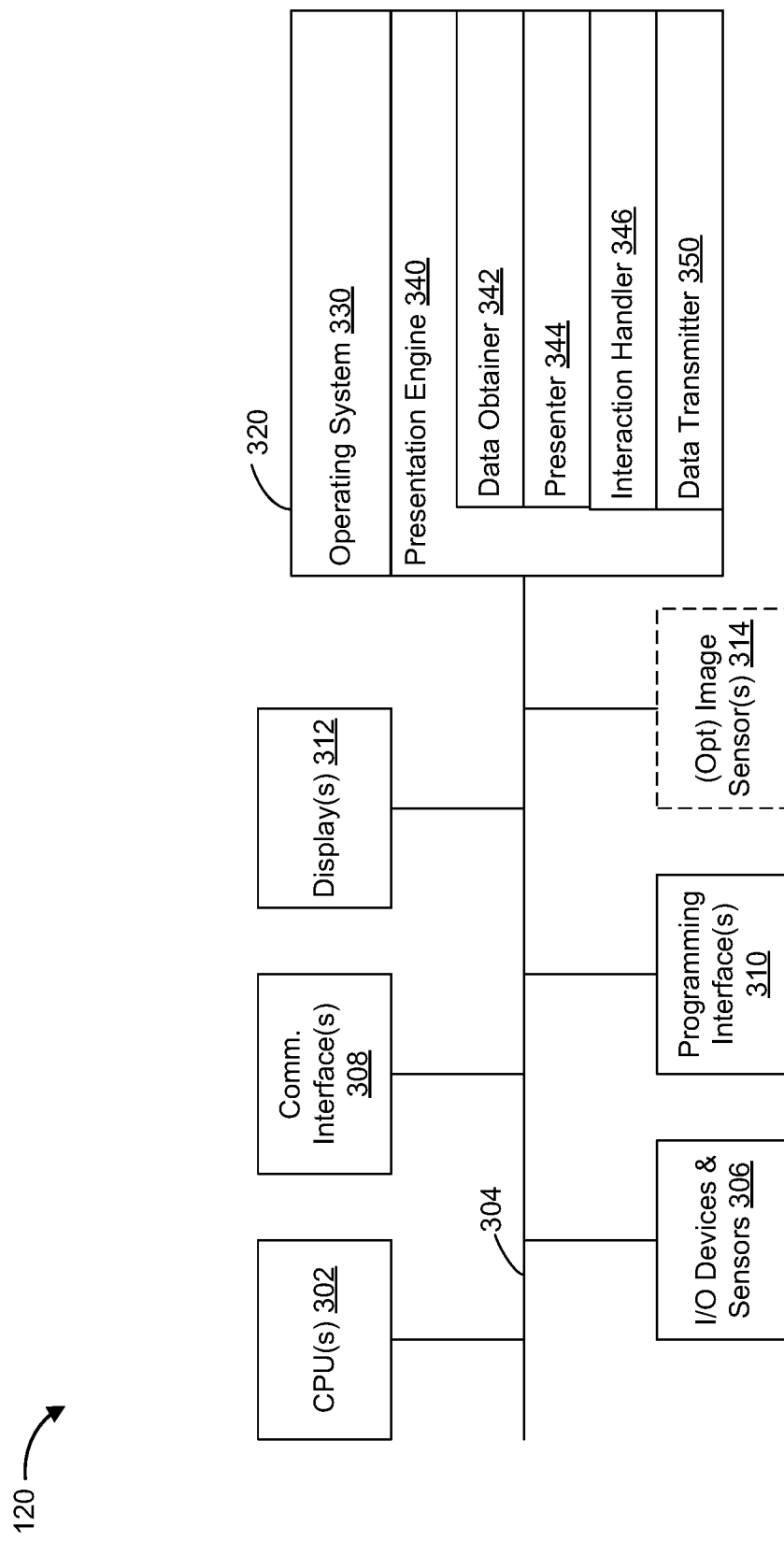
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, the one or more optional image sensors 314 (e.g., one or more optional interior-facing and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, a body/head pose tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation engine 340.

The operating system 330 includes procedures for handling various basic system services and for performing hardware dependent tasks. In some implementations, the XR presentation engine 340 is configured to present XR content to the user via the one or more displays 312. To that end, in various implementations, the XR presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update XR content (e.g., the rendered image frames associated with the XR environment) via the one or more displays 312. To that end, in various implementations, the presenter 344 includes instructions and/or logic therefor, and heuristics and metadata therefor.

In some implementations, the interaction handler 346 is configured to detect user interactions with the presented XR content. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
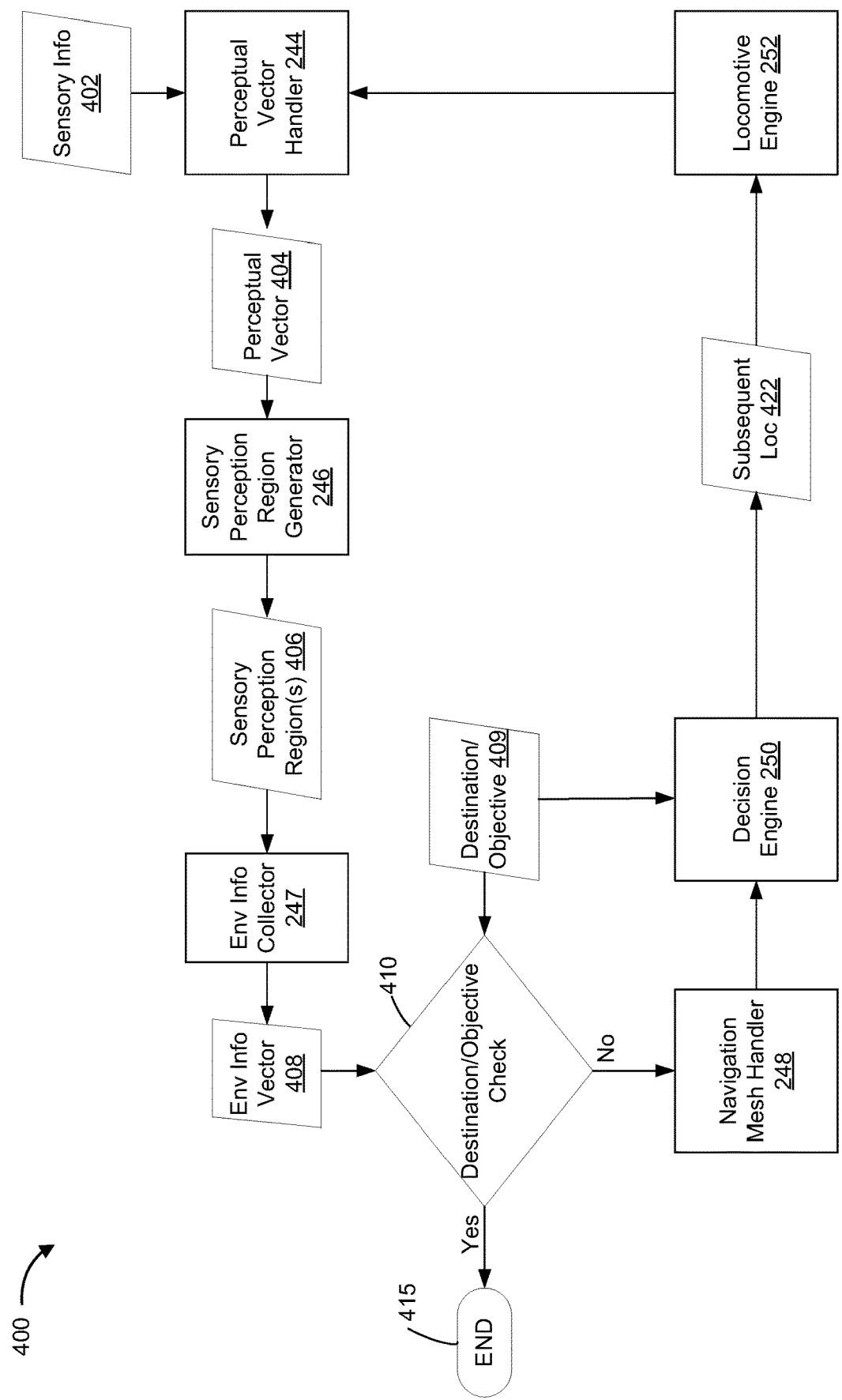
FIG. 4 is a block diagram of an example navigation mesh exploration architecture in accordance with some implementations.

FIG. 4 is a block diagram of an example navigation mesh exploration architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the navigation mesh exploration architecture 400 is included in or provided by the controller 110 shown in FIGS. 1 and 2 or a component thereof (e.g., the VA OS engine 240 in FIG. 2). One of ordinary skill in the art will appreciate that while the below description discusses the navigation mesh exploration architecture 400 handling a single virtual agent, the navigation mesh exploration architecture 400 may handle a plurality of virtual agents within the XR environment in various other implementations.

According to some implementations, the VA OS engine 240 instantiates a virtual agent into an XR environment at an origin. For example, a user instantiates the virtual agent into the XR environment at the origin by selecting the virtual agent from a set of available virtual agents and also selecting a location within the XR environment as the origin. As another example, the VA OS engine 240 intelligently or pseudo-randomly selects the virtual agent from a set of available virtual agents and also selecting a location within the XR environment as the origin. In some implementations, the virtual agent is associated with a set of one or more senses (e.g., sight, smell, hearing, touch, and/or the like) and acuity parameters or values for the set of one or more senses. An example sensory acuity profile 526 is described in more detail below with reference to FIG. 5A.

According to some implementations, the virtual agent may be replaced with an unmanned vehicle (UV) such as an aerial vehicle (e.g., a drone, airplane, helicopter, dirigible, or the like), a tracked vehicle, a wheeled vehicle, a waterborne vehicle (e.g., a boat or hovercraft), an underwater vehicle, an outer space vehicle, or the like. In some implementations, the UV may include a plurality of input sensors and/or output devices similar to those described with reference to the electronic device 120 in FIGS. 1 and 3. One of ordinary skill in the art will appreciate how the VA OS engine 240 may be replaced or modified to drive the UV and build out a navigation mesh for an environment (e.g., an XR or physical environment).

As shown in FIG. 4, the virtual agent obtains sensory information 402 by using its set of one or more senses to collect information regarding the current location of the virtual agent (e.g., the origin). According to some implementations, the perceptual vector handler 244 generates a perceptual vector 404 based on the sensory information 402 collected by the virtual agent from the origin. An example perceptual vector 404 is described in more detail below with reference to FIG. 5A.

According to some implementations, the sensory perception region generator 246 generates one or more sensory perception regions 406 for the virtual agent based on the perceptual vector 404 with respect to the current location of the virtual agent (e.g., the origin or a subsequent location). For example, the one or more sensory perception regions correspond to representation(s) or visualization(s) of the perceptual capabilities or bounds of the VA. As such, in one example, the one or more sensory perception regions for a particular VA corresponds to a viewing frustum, an aural perception region, an olfactory perception region, and/or the like. Example sensory perception regions are described in more detail below with reference to FIGS. 6A-6C.

According to some implementations, the environmental information collector 247 obtains an environmental information vector 408 that characterizes the XR environment within the one or more sensory perception regions 406 with respect to the current location of the virtual agent (e.g., the origin or a subsequent location). An example environmental information vector 408 is described in more detail below with reference to FIG. 5A.

As shown in FIG. 4, the navigation mesh exploration architecture 400 performs a destination/objective check 410 to determine whether the virtual agent has reached/achieved its target destination/objective 409. If the target destination/objective 409 has been satisfied (e.g., the target destination has been reached or the objective has been achieved), the virtual agent stops locomoting and the process reaches its end 415.

However, if the target destination/objective 409 has not been satisfied, the navigation architecture 400 generates a navigation mesh or updates the current navigation mesh for the XR environment based on the environmental information vector 408. According to some implementations, the navigation mesh handler 248 generates a first portion of a navigation mesh for the XR environment based on the locomotive profile for the virtual agent and the environmental information vector 408 with respect to the current location of the virtual agent (e.g., the origin or a subsequent location). For example, the navigation mesh (or the portion thereof) is generated by using one or more techniques known in the art such as local clearance triangulation, explicit corridor map, clearance disk graph, recast, NEO-GEN, and/or the like. According to some implementations, the navigation mesh handler 248 updates an existing navigation mesh by merging two or more portions (e.g., a newly generated portion and one or more previously generated portions) thereof and/or the like.

According to some implementations, the decision engine 250 determines one or more candidate subsequent locations for the virtual agent based on the current navigation mesh for the XR environment. In some implementations, the decision engine 250 also selects a subsequent location 422 for the virtual from the or more candidate subsequent locations based on the target destination/objective 409 for the VA (e.g., build-out the navigation mesh for the XR environment).

According to some implementations, the locomotive engine 252 actuates one or more locomotive elements (e.g., joints, limbs, etc.) of the virtual agent based on a locomotive profile for the VA in order to move the virtual agent to the subsequent location 422 within the XR environment. Thereafter, the virtual agent obtains updated sensory information 402 by using the set of one or more senses to collect updated information regarding the current location of the virtual agent (e.g., the subsequent location 422) and the process continues.

Figure 5A:
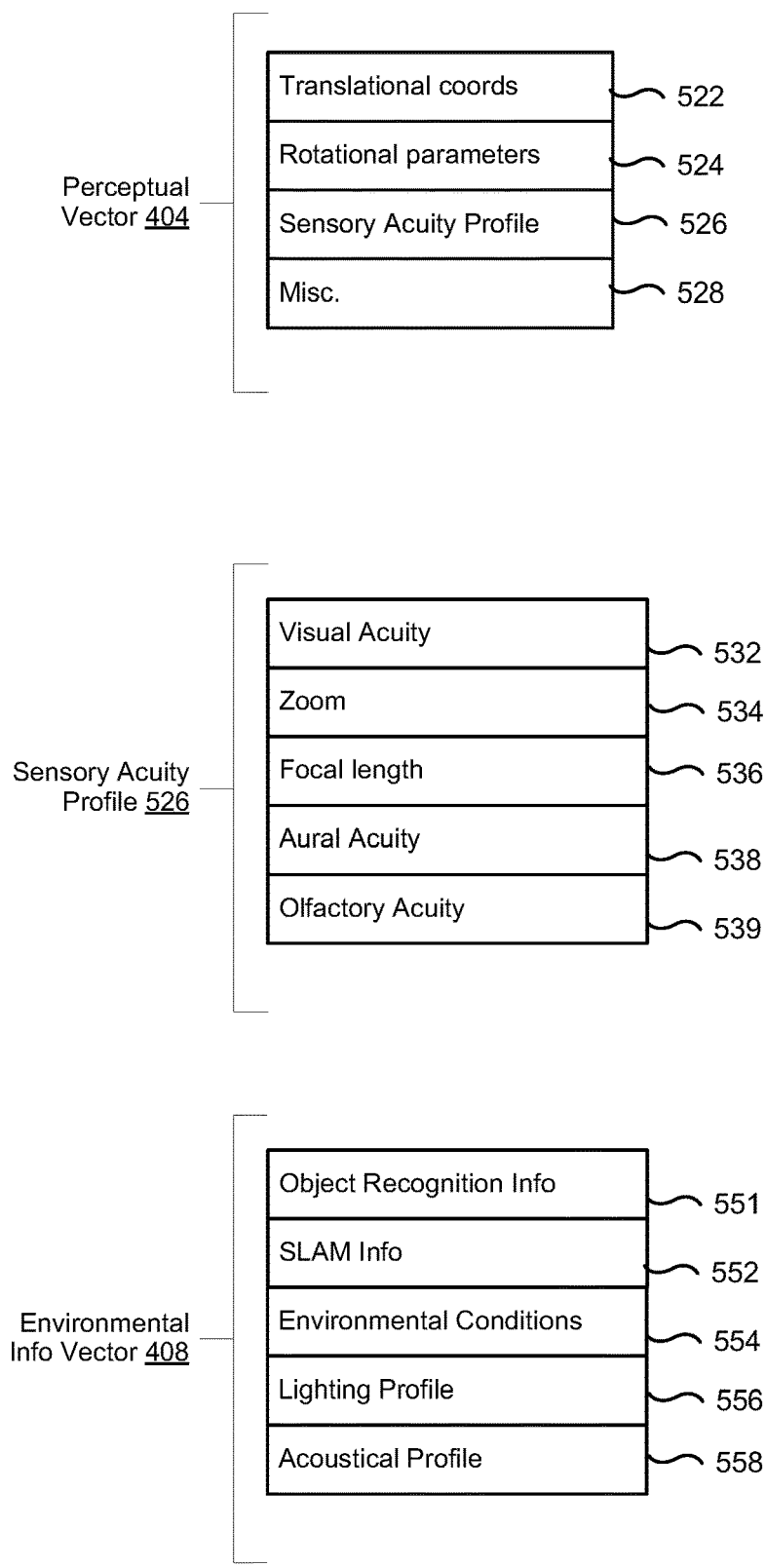
FIGS. 5A and 5B illustrate block diagrams of example data structures in accordance with some implementations.
Figure 5B:
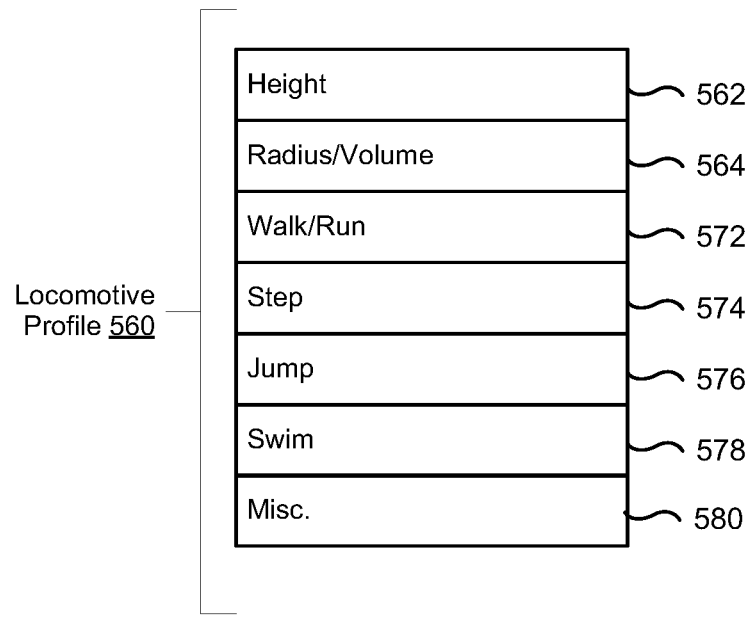

FIGS. 5A and 5B illustrate block diagrams of example data structures in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 5A shows block diagrams of data structures for a perceptual vector 404, a sensory acuity profile 526, and an environmental information vector 408 in accordance with some implementations. For example, the controller 110 or a component thereof (e.g., the perceptual vector handler 244 in FIG. 2) obtains (e.g., receives, retrieves, or generates) the perceptual vector 404 for a respective virtual agent within an XR environment based on sensory information collected based on the one or more senses of the virtual agent and the sensory acuity profile 526 therefor.

According to some implementations, the perceptual vector 404 includes: translational coordinates 522 associated with a current location of the virtual agent relative to the XR environment, rotational parameters 524 associated with the current field-of-perception of the virtual agent within the XR environment, the sensory acuity profile 526 of the virtual agent, and miscellaneous parameters or characteristics 528 associated with the virtual agents relative to its current location within the XR environment. As such, for example, the perceptual vector 404 may comprise six (6) degrees of freedom: x, y, z dimensions associated with the translational coordinates 522; and roll, pitch, and yaw dimensions associated with the rotational parameters 524.

According to some implementations, the sensory acuity profile 526 characterizes the sensitivity or intensity of the senses of the virtual agent including a visual acuity parameter 532, a zoom parameter 534, a focal length parameter 536, an aural acuity parameter 538, and an olfactory acuity parameter 539. For example, the visual acuity parameter 532 corresponds to the spatial resolution or visual perception of the virtual agent such as 20/20 or other quantitative vision measurements, near-sightedness, far-sightedness, astigmatism, and/or the like. For example, the zoom parameter 534 corresponds to a magnification value associated with the visual perception of the virtual agent. For example, the focal length parameter 536 corresponds to a focal length or focal point associated with the visual perception of the virtual agent. For example, the aural acuity parameter 538 corresponds to the aural perception of the virtual agent such as a hearing impairment in one or both ears, inability to hear sounds over or under a specific frequency, hearing sensitivity for different frequencies at different intensities, and/or the like. For example, the olfactory acuity parameter 539 correspond to the olfactory perception of the virtual agent such as a smelling impairment, inability to smell certain items, different smelling sensitivities for different smell intensities, and/or the like.

In some implementations, the aforenoted parameters are obtained during a calibration process on a user-by-user basis. In some implementations, the aforenoted parameters are manually entered by a user. In some implementations, the aforenoted parameters are obtained over time based on user interaction data. One of ordinary skill in the art will appreciate that virtual agents may have myriad senses with various permutations of sensitivities, intensities, and/or the like.

For example, the controller 110 or a component thereof (e.g., the environmental information collector 247 in FIG. 2) obtains (e.g., receives, retrieves, or generates) the environmental information vector 408 associated with the one or more sensory perception regions that characterize the XR environment from the current location of the virtual agent. According to some implementations, the environmental information vector 408 characterizes the XR environment from the current location of the virtual agent. For example, the environmental information vector 408 is obtained by performing object recognition, semantic segmentation, simultaneous localization and mapping (SLAM), and/or the like on the one or more sensory perception regions of the XR environment that are associated with the current location of the virtual agent.

For example, as shown in FIG. 5A, the environmental information vector 408 includes object recognition information 551 relative to the current location of the virtual agent (e.g., objects recognized within the field-of-perception defined by the current location of the virtual agent), SLAM information 552 relative to the current location of the virtual agent (e.g., a map of the dimensions of the XR environment perceivable from the current location of the virtual agent), environmental conditions 554 associated with the XR environment, a lighting profile 556 associated with the XR environment, and an acoustical profile 556 associated with the XR environment. For example, the environmental conditions 554 correspond to conditions that affect visual, aural, and/or olfactory perception such as fog, smoke, humidity, lighting conditions, and/or the like that have been set for the XR environment or a reference physical environment associated with the XR environment. For example, the lighting profile 556 includes one or more lighting measurements for the XR environment or a reference physical environment associated with the XR environment. For example, the acoustical profile 558 includes one or more acoustical measurements for the XR environment or a reference physical environment associated with the XR environment.

FIG. 5B shows a block diagram of a data structures for a locomotive profile 560 in accordance with some implementations. According to some implementations, the locomotive profile 560 shown in FIG. 5B includes size characteristics for a particular VA (e.g., height, width, depth, radius, etc.) and movement characteristics for the virtual agent. (e.g., gait size, jump height, jump length, walk and run speed, etc.).

As shown in FIG. 5B, the locomotive profile 560 includes: a height characteristic 562 for the particular VA (e.g., a height value to determine overhead clearance), and a radius or volume characteristic 564 for the particular VA (e.g., a radius value to determine a berth region). The locomotive profile 560 further includes: a walk/run characteristic 572 for the particular VA (e.g., velocity, acceleration, etc. values for various modes of locomotion), a step characteristic 574 for the particular VA (e.g., a displacement value for each pace/step), a jump characteristic 576 for the particular VA (e.g., a height value for each jump), a swim characteristic 578 (e.g., a displacement value for each swim stroke) for the particular VA, and a miscellaneous characteristic 580 for the particular VA. One of ordinary skill in the art will appreciate that the locomotive profile 560 is merely an example and may include various other characteristics. One of ordinary skill in the art will appreciate that locomotive profiles for different VAs may change based on their type (e.g., animal, humanoid, robot, etc.) or various attributes (e.g., average humanoid, athletic humanoid, superhuman humanoid, etc.).

Figure 6A:
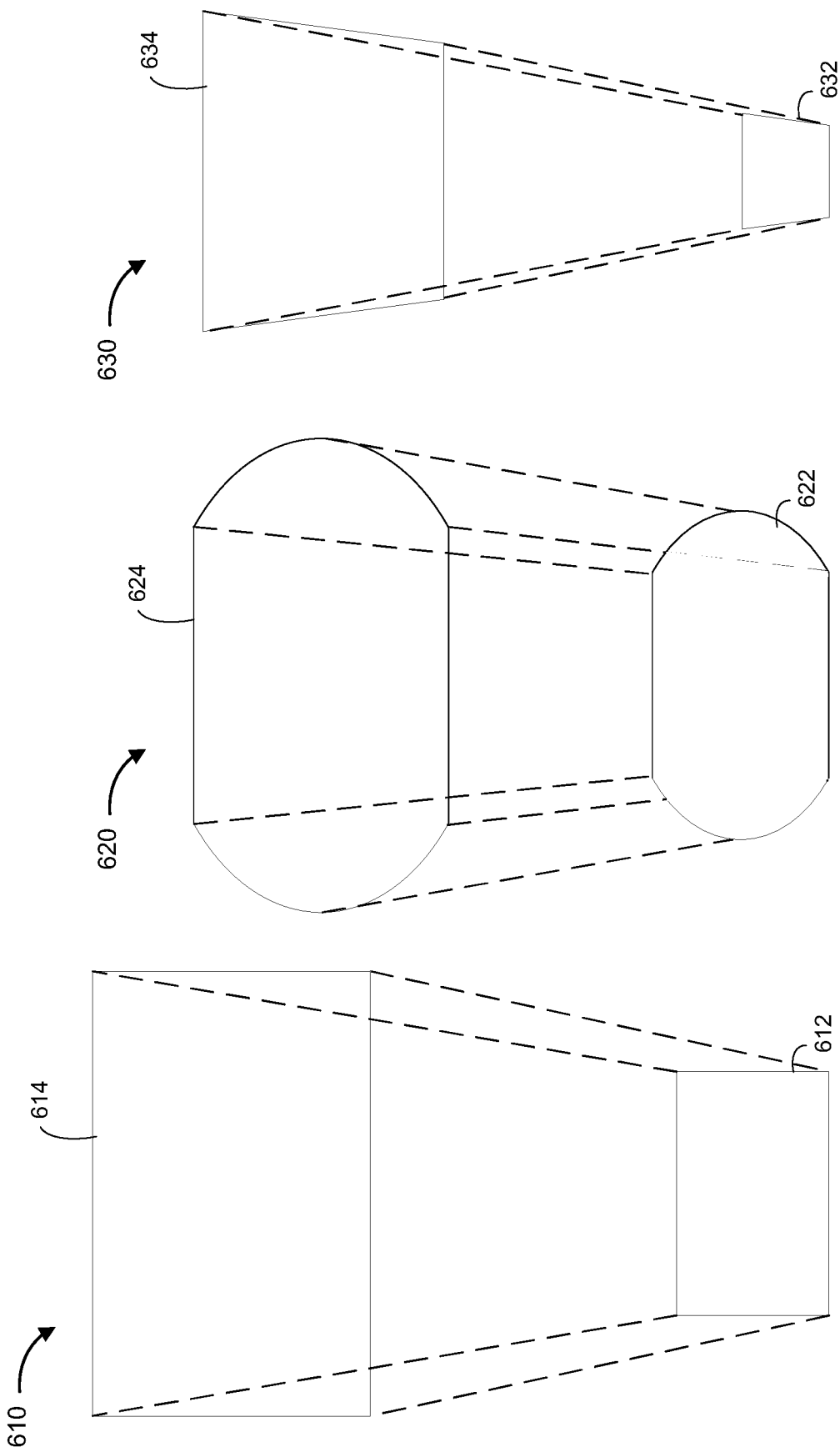
FIG. 6A illustrates example viewing frustums in accordance with some implementations.

FIG. 6A illustrates example viewing frustums 610, 620, and 630 in accordance with some implementations. In FIG. 6A, as one example, the viewing frustum 610 includes a near rectangular plane 612 and a far rectangular plane 614. As another example, the viewing frustum 620 includes a near elliptical plane 622 and a far elliptical plane 624. As yet another example, the viewing frustum 630 includes a near trapezoidal plane 632 and a far trapezoidal plane 634. One of ordinary skill in the art will appreciate that the viewing frustums may have various shapes, depths, widths, heights, and/or the like.

Figure 6B:
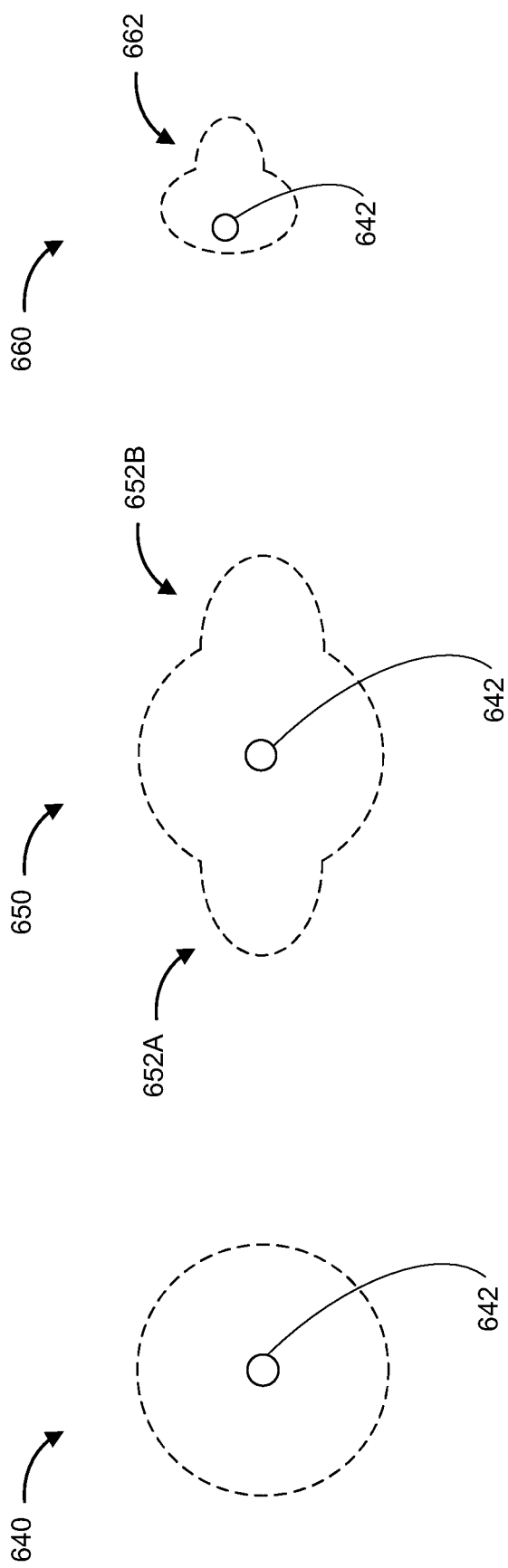
FIG. 6B illustrates example aural perception regions in accordance with some implementations.

FIG. 6B illustrates example aural perception regions 640, 650, and 660 in accordance with some implementations. In FIG. 6B, as one example, the aural perception region 640 corresponds to a top-down view of a spherical audible region centered on a virtual agent 642. As another example, the aural perception region 650 is similar to the aural perception region 640 but includes peripheral lobes 652A and 652B near the ears of the virtual agent 642. As yet another example, the aural perception region 660 is similar to the aural perception regions 640 and 650 but includes a single lobe 662 on the right side and a truncated left side due to hearing impairment in the left ear of the virtual agent 642. One of ordinary skill in the art will appreciate that the aural perception regions may have various shapes, volumes, depths, widths, heights, and/or the like.

Figure 6C:
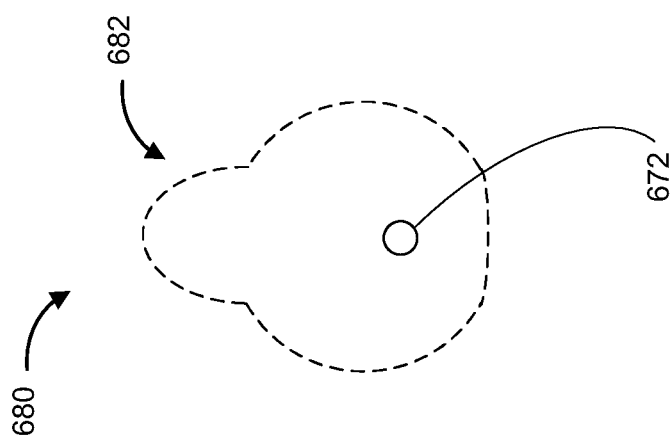
FIG. 6C illustrates example olfactory perception regions in accordance with some implementations.
Figure 6C:
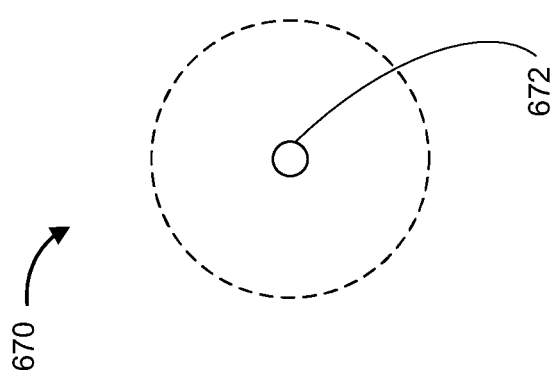

FIG. 6C illustrates example olfactory perception regions in accordance with some implementations. In FIG. 6C, as one example, the olfactory perception region 670 corresponds to a top-down view of a spherical olfactory region centered on a virtual agent 672. As another example, the olfactory perception region 680 is similar to the olfactory perception region 670 but includes an elongated lobe 682 at the front of the virtual agent 672 due to enhanced smell capability in front of the virtual agent 672. One of ordinary skill in the art will appreciate that the olfactory perception regions may have various shapes, volumes, depths, widths, heights, and/or the like.

Figure 7:
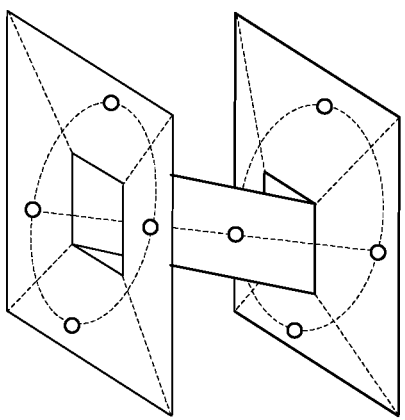
FIG. 7 illustrates an example navigation mesh for a 3D environment in accordance with some implementations.
Figure 7:
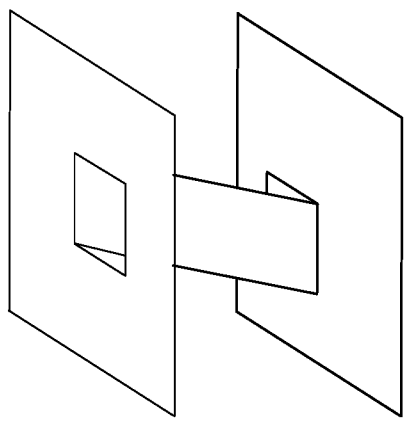
Figure 7:
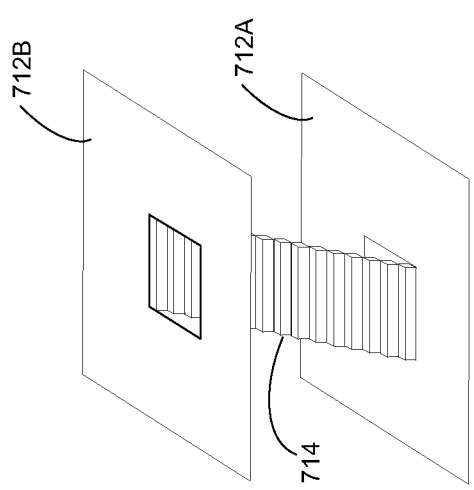

FIG. 7 illustrates an example navigation mesh 730 for a 3D environment 710 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

According to some implementations, a two-dimensional (2D) environment is a finite subset of a 2D plane with polygonal holes also referred to as obstacles. The obstacle space $\varepsilon_{obs}$ is the union of all obstacles. Its complement is the free space $\varepsilon_{free}$. Then, n is assigned to the number of vertices required to define $\varepsilon_{obs}$ or $\varepsilon_{free}$ using simple polygons. As such, n may also be referred to as the complexity of $\varepsilon$. 2D and 3D environments should be treated similarly.

Therefore, a 2D environment may be embedded in $\mathbb{R}^3$ by assigning a height component of zero to each vertex. A 3D environment is a raw collection of polygons in $\mathbb{R}^3$. These polygons may include floors, ceilings, walls, or any other type of geometry. For example, the 3D environment 710 in FIG. 7 corresponds to a mon-planar, multi-layer 3D environment with a stairway 714 connecting a first floor 712A to a second floor 712B.

To define the free space $\varepsilon_{free}$ of a 3D environment, various parameters are delineated that describe the surfaces on which a virtual agent (VA) may walk. Examples of such parameters are the maximum slope with respect to the direction of gravity, the maximum height difference between nearby polygons (e.g., the maximum step height of a staircase), and the required vertical distance between a floor and a ceiling. VAs are typically approximated by cylinders. Some navigation meshes use a predefined VA radius to determine $\varepsilon_{free}$.

A walkable environment (WE) is a set of interior-disjoint polygons in $\mathbb{R}^3$ on which VAs can stand and walk. Thus, a WE is a clean representation of the free space $\varepsilon_{free}$ of a 3D environment, based on the filtering parameters and character properties mentioned earlier. Any two polygons are directly connected if and only if characters can walk directly between them. For example, the walkable environment 720 in FIG. 7 is a function of the 3D environment 710 and shows the regions on which a VA can directly walk. All polygons in the WE have a maximum slope with respect to the ground plane P, which is the plane perpendicular to the gravity direction $\vec{g}$. It is common for a navigation mesh to project the length of a path onto P as well, i.e., to ignore height differences along a path during planning.

The complexity of a WE is the total number of polygon vertices. The free space $\varepsilon_{free}$ is simply the set of polygons itself. The obstacle space $\varepsilon_{obs}$ can be thought of as anything beyond the boundary of $\varepsilon_{free}$, but (unlike in 2D) it is difficult to represent or visualize because it does not necessarily consist of polygons on a plane.

After defining the free space $\varepsilon_{free}$, a navigation mesh can be defined as a tuple M=(R,G):

R={$R_0$, $R_1$, . . . } is a collection of geometric regions in $\mathbb{R}^3$ that represents $\varepsilon_{free}$. Each region $R_i$ is P-simple, which means that a region cannot intersect itself when projected onto the ground plane P.

G=(V, E) is an undirected graph that describes how characters can navigate between the regions in R.

For example, the navigation mesh 730 in FIG. 7 is a function of the 3D environment 710 and shows an abstract example of a navigation mesh. For many navigation meshes, R consists of non-overlapping simple polygons, and G is the dual graph of R, with one vertex per region and one edge per pair of adjacent region sides. However, other possibilities exist. As one example, using the Clearance Disk Graph technique, R consists of overlapping disks, and G contains an edge wherever two disks overlap. Still, in common across all meshes is that R and G can be obtained from their representation in some way.

One of ordinary skill in the art will appreciate that navigation meshes may be generated from various 3D environments. One of ordinary skill in the art will appreciate that navigation meshes may be generated according to various techniques known in the art such as local clearance triangulation, explicit corridor map, clearance disk graph, recast, NEOGEN, and/or the like.

FIGS. 8A-8D illustrate a sequence of instances 810, 820, 830, and 840 for a navigation mesh exploration scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the sequence of instances 810, 820, 830, and 840 is handled or managed by the controller 110 shown in FIGS. 1 and 2 or a component thereof (e.g., the VA OS engine 240 in FIG. 2).

As shown in FIGS. 8A-8D, the instances 810, 820, 830, and 840 (e.g., associated times T1, T2, T3, and T4, respectively) of the navigation mesh exploration scenario show a third-person top-down plan view 802 of an XR environment, a first-person perspective view 811 of the XR environment from the perspective of the virtual agent, and an accumulated navigation mesh 808 associated with the XR environment as the virtual agent moves about the XR environment over time. For example, the XR environment in FIGS. 8A-8D includes a first room 803A, a second room 803B, and a third room 803C.

According to some implementations, the XR environment shown in FIGS. 8A-8D corresponds to a physical environment with or without overlaid XR content (e.g., skinned walls). In some implementations, the XR environment shown in FIGS. 8A-8D corresponds to a fully virtual environment. Thus, for example, the XR environment corresponds to a video game level with one or more VAs (e.g., non-player characters (NPCs)) instantiated therein. One of ordinary skill in the art will appreciate that the XR environment may take myriad forms.

Figure 8A:
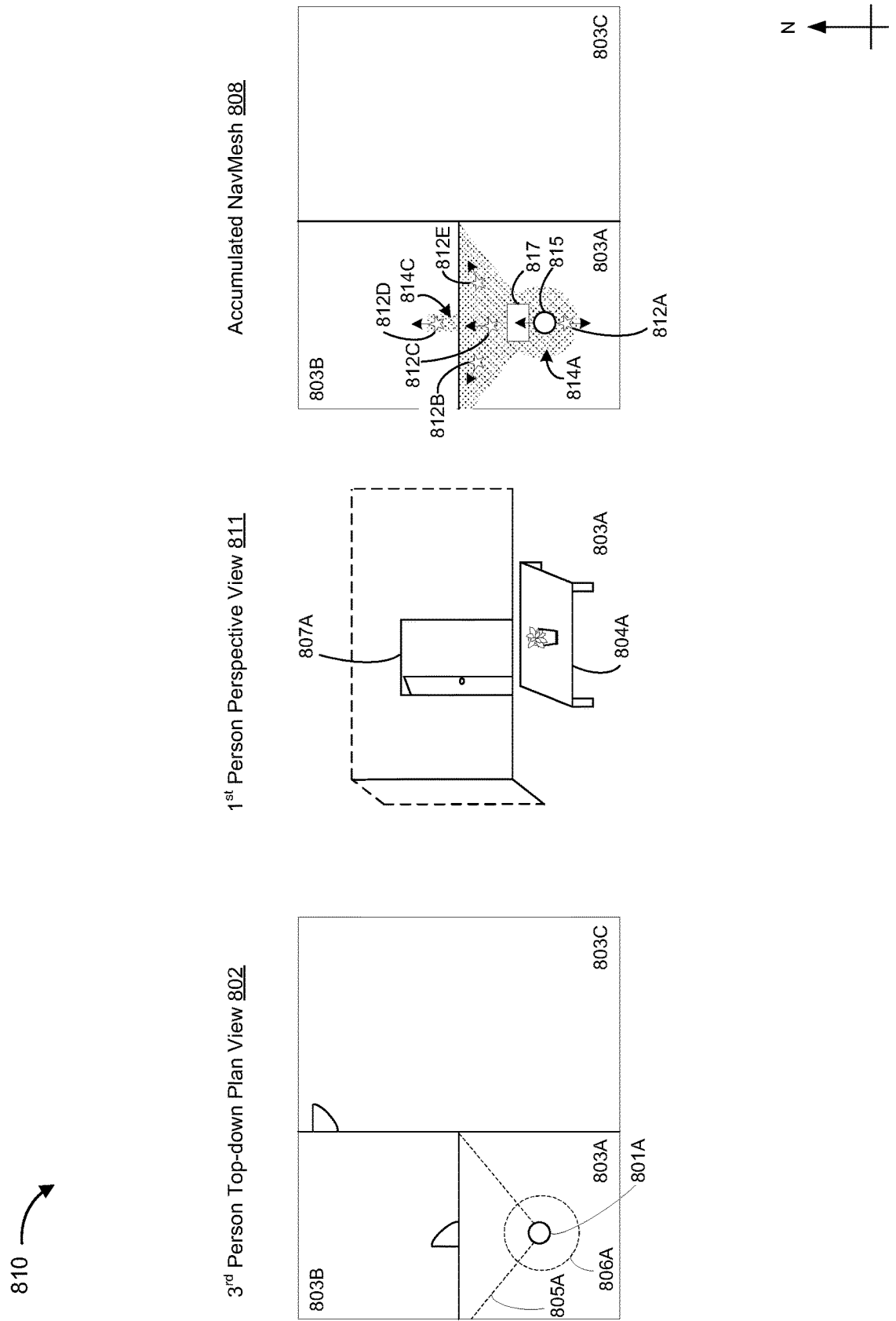
FIGS. 8A-8D illustrate a sequence of instances for a navigation mesh exploration scenario in accordance with some implementations.

As shown in FIG. 8A, with reference to the instance 810 (e.g., associated with time T1), the third-person top-down plan view 802 includes a representation 801A of the virtual agent at a first location (e.g., the origin) as well as a first representation of the viewing frustum 805A of the virtual agent relative to the first location and a first representation of the aural perception region 806A of the virtual agent relative to the first location. As shown in FIG. 8A, with reference to the instance 810 (e.g., associated with time T1), the first-person perspective view 811 includes an obstacle 804A (e.g., a table) and a door 807A that connects the first room 803A and the second room 803B.

According to some implementations, the first representation of the viewing frustum 805A indicates the field-of-view or cone of vision from the perspective of the representation 815 of the virtual agent in a top-down manner for ease of visualization. According to some implementations, the first representation of the aural perception region 806A indicates the field or region of aural perception from the perspective of the representation 815 of the virtual agent in a top-down manner for ease of visualization. One of ordinary skill in the art will appreciate that the first representation of the viewing frustum 805A and the first representation of the aural perception region 806A are volumetric regions that may also be visualized in 3D but are shown in a top-down manner for ease of visualization in FIGS. 8A-8D.

As shown in FIG. 8A, with reference to the instance 810 (e.g., associated with time T1), the accumulated navigation mesh 808 includes a representation 815 of the virtual agent with a heading marker indicating that the virtual agent's field-of perception is pointed north, a representation 817 of the obstacle 804A, and a first portion 814A of a navigation mesh for the XR environment. As shown in FIG. 8A, the first portion 814A of the navigation mesh includes a circular sub-portion associated with the first representation of the aural perception region 806A, a conical sub-portion associated with the first representation of the viewing frustum 805A on the near-side of the door 807A, and a rectangular strip associated with the first representation of the viewing frustum 805A on the far-side of the door 807A. According to some implementations, the VA OS engine 240 in FIG. 2 or a component thereof (e.g., the navigation mesh handler 248 in FIGS. 2 and 4) generates the first portion 814A of the navigation mesh for the XR environment based on the locomotive profile for the virtual agent and a first environmental information vector that characterizes the first representation of the viewing frustum 805A and the first representation of the aural perception region 806A. For example, the representation 817 of the obstacle 804A corresponds to a hole within the first portion 814A of the navigation mesh for the XR environment.

As shown in FIG. 8A, with reference to the instance 810 (e.g., associated with time T1), the accumulated navigation mesh 808 also includes a plurality of candidate subsequent locations 812A, 812B, 812C, 812D, and 812E (sometimes collectively referred to herein as the "plurality of candidate subsequent locations 812") for the virtual agent. In FIG. 8A, each of the plurality of candidate subsequent locations 812 is associated with a heading marker.

In this example, with reference to FIG. 8A, the VA OS engine 240 in FIG. 2 or a component thereof (e.g., the decision engine 250 in FIGS. 2 and 4) determines the plurality of candidate subsequent locations 812 and selects the candidate subsequent location 812D as the subsequent location for the virtual agent in order to explore the XR environment more quickly or build-out the navigation mesh for the XR environment. To that end, continuing with this example, the VA OS engine 240 in FIG. 2 or a component thereof (e.g., the locomotive engine 252 in FIGS. 2 and 4) actuates one or more locomotive elements (e.g., joints, limbs, etc.) of the virtual in order to move the virtual agent to the selected subsequent location (e.g., the candidate subsequent location 812D).

Figure 8B:
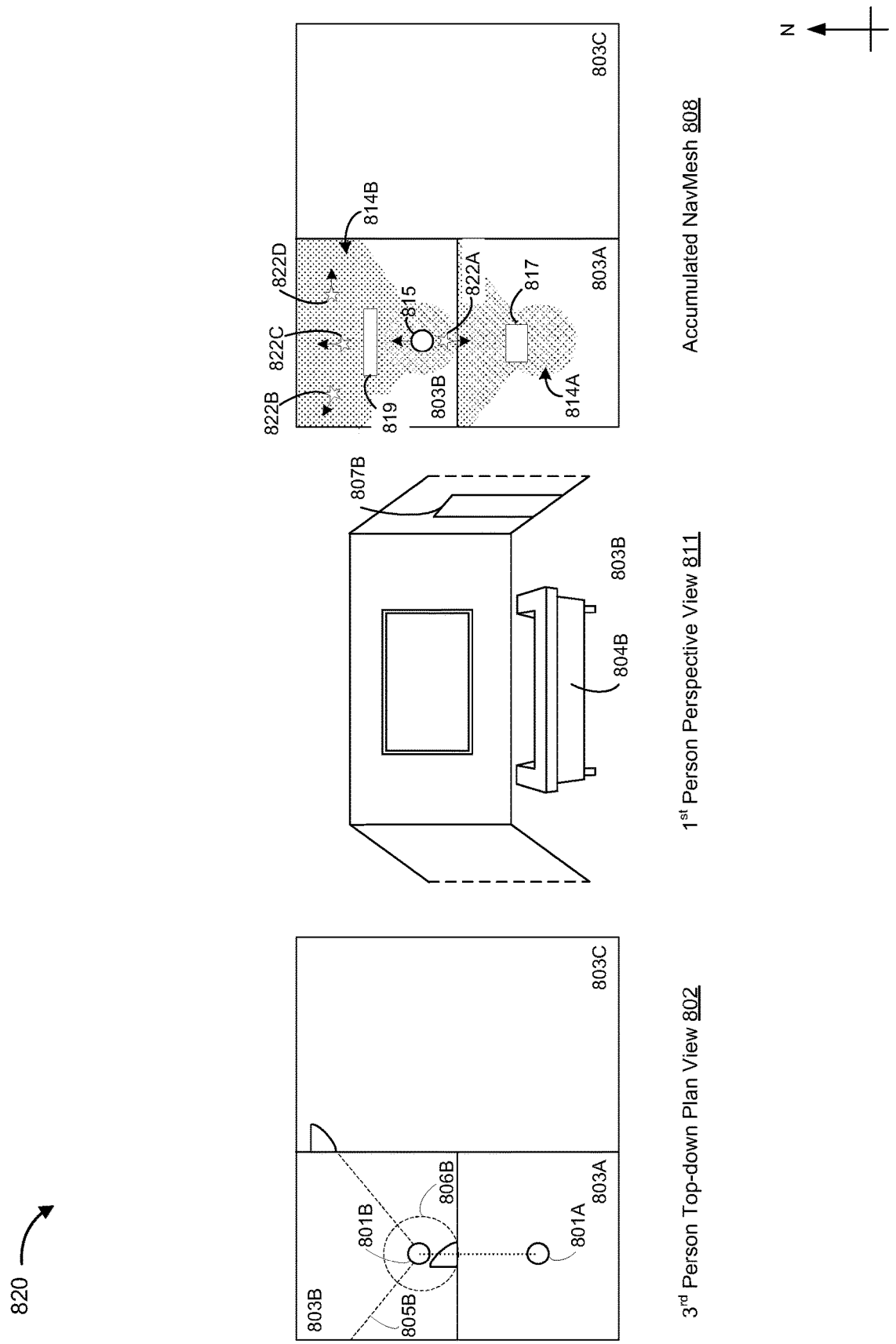

As shown in FIG. 8B, with reference to the instance 820 (e.g., associated with time T2), the third-person top-down plan view 802 from a second location (e.g., the candidate subsequent location 812D) includes a representation 801B of the virtual agent at the second location as well as a second representation of the viewing frustum 805B of the virtual agent relative to the second location and a second representation of the aural perception region 806B of the virtual agent relative to the second location. As shown in FIG. 8B, with reference to the instance 820 (e.g., associated with time T2), the first-person perspective view 811 from the second location (e.g., candidate subsequent location 812D) includes another obstacle 804B (e.g., a couch) and a door 807B that connects the second room 803B and the third room 803C.

As shown in FIG. 8B, with reference to the instance 820 (e.g., associated with time T2), the accumulated navigation mesh 808 includes the representation 815 of the virtual agent with a heading marker indicating that the virtual agent's field-of perception is pointed north, a representation 819 of the obstacle 804B, and a second portion 814B of the navigation mesh for the XR environment. As shown in FIG. 8B, the second portion 814B of the navigation mesh includes a circular sub-portion associated with the second representation of the aural perception region 806B and a conical sub-portion associated with the second representation of the viewing frustum 805B. According to some implementations, the VA OS engine 240 in FIG. 2 or a component thereof (e.g., the navigation mesh handler 248 in FIGS. 2 and 4) generates the second portion 814B of the navigation mesh for the XR environment based on the locomotive profile for the virtual agent and a second environmental information vector that characterizes the second representation of the viewing frustum 805B and the second representation of the aural perception region 806B. For example, the representation 819 of the obstacle 804B corresponds to a hole within the second portion 814B of the navigation mesh for the XR environment.

As shown in FIG. 8B, with reference to the instance 820 (e.g., associated with time T2), the accumulated navigation mesh 808 also includes a plurality of candidate subsequent locations 822A, 822B, 822C, and 822D (sometimes collectively referred to herein as the "plurality of candidate subsequent locations 822") for the virtual agent. In FIG. 8B, each of the plurality of candidate subsequent locations 812 is associated with a heading marker.

In this example, with reference to FIG. 8B, the VA OS engine 240 in FIG. 2 or a component thereof (e.g., the decision engine 250 in FIGS. 2 and 4) determines the plurality of candidate subsequent locations 822 and selects the candidate subsequent location 822D as the subsequent location for the virtual agent in order to explore the XR environment more quickly or build-out the navigation mesh for the XR environment. To that end, continuing with this example, the VA OS engine 240 in FIG. 2 or a component thereof (e.g., the locomotive engine 252 in FIGS. 2 and 4) actuates one or more locomotive elements (e.g., joints, limbs, etc.) of the virtual in order to move the virtual agent to the selected subsequent location (e.g., the candidate subsequent location 822D).

Figure 8C:
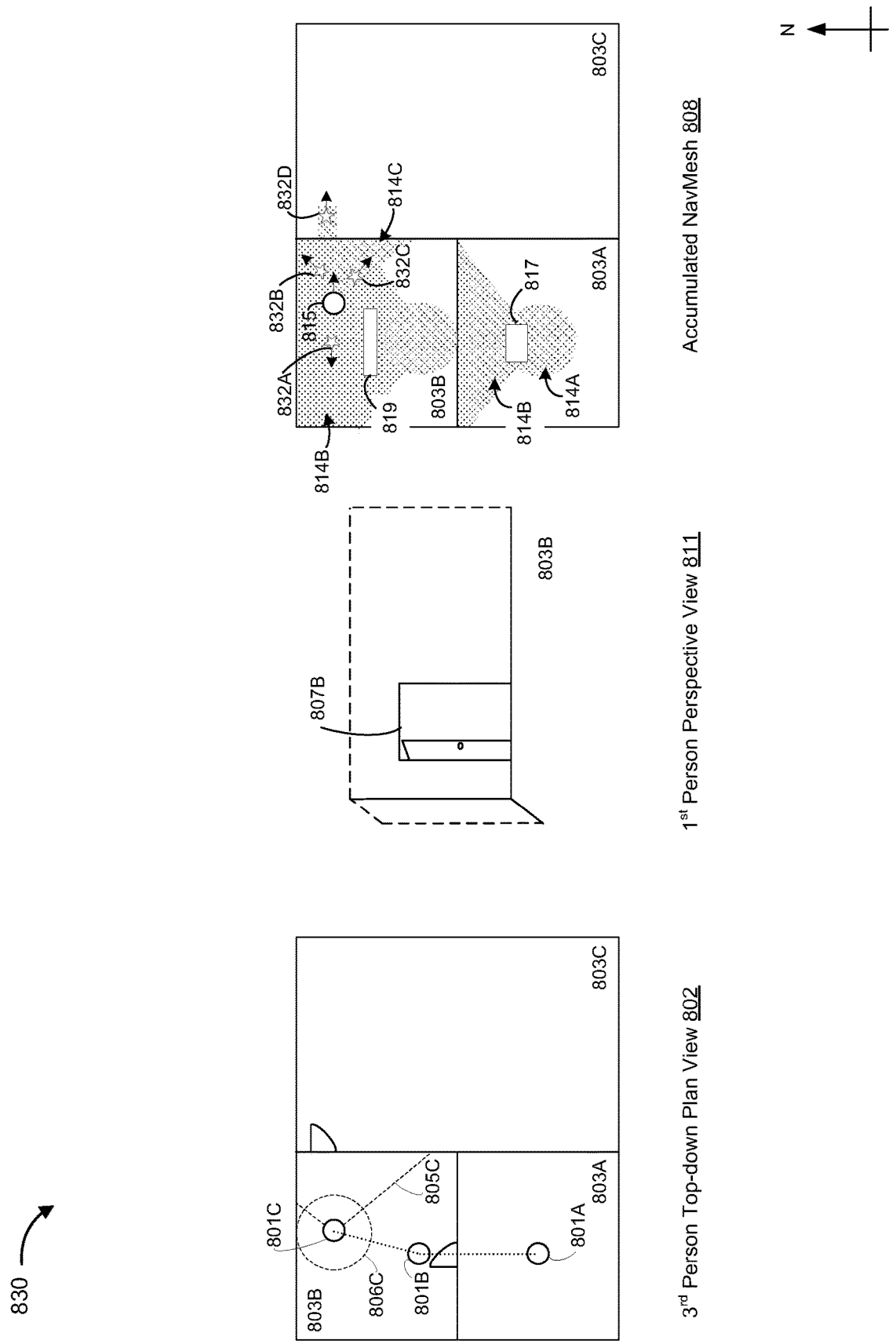

As shown in FIG. 8C, with reference to the instance 830 (e.g., associated with time T3), the third-person top-down plan view 802 includes a representation 801C of the virtual agent at a third location (e.g., the candidate subsequent location 822D) as well as a third representation of the viewing frustum 805C of the virtual agent relative to the third location and a third representation of the aural perception region 806C of the virtual agent relative to the third location. As shown in FIG. 8C, with reference to the instance 830 (e.g., associated with time T3), the first-person perspective view 811 includes the door 807B that connects the first room 803A and the second room 803B.

As shown in FIG. 8C, with reference to the instance 830 (e.g., associated with time T3), the accumulated navigation mesh 808 includes the representation 815 of the virtual agent with a heading marker indicating that the virtual agent's field-of perception is pointed east, and a third portion 814C of a navigation mesh for the XR environment. As shown in FIG. 8C, the third portion 814C of the navigation mesh includes a conical sub-portion associated with the third representation of the viewing frustum 805C on the near-side of the door 807B and a rectangular strip associated with the third representation of the viewing frustum 805C on the far-side of the door 807B. According to some implementations, the VA OS engine 240 in FIG. 2 or a component thereof (e.g., the navigation mesh handler 248 in FIGS. 2 and 4) generates the third portion 814C of the navigation mesh for the XR environment based on the locomotive profile for the virtual agent and a third environmental information vector that characterizes the third representation of the viewing frustum 805C and the third representation of the aural perception region 806C.

As shown in FIG. 8C, with reference to the instance 830 (e.g., associated with time T3), the accumulated navigation mesh 808 also includes a plurality of candidate subsequent locations 832A, 832B, 832C, and 832D (sometimes collectively referred to herein as the "plurality of candidate subsequent locations 832") for the virtual agent. In FIG. 8C, each of the plurality of candidate subsequent locations 832 is associated with a heading marker.

In this example, with reference to FIG. 8C, the VA OS engine 240 in FIG. 2 or a component thereof (e.g., the decision engine 250 in FIGS. 2 and 4) determines the plurality of candidate subsequent locations 832 and selects the candidate subsequent location 832D as the subsequent location for the virtual agent in order to explore the XR environment more quickly or build-out the navigation mesh for the XR environment. To that end, continuing with this example, the VA OS engine 240 in FIG. 2 or a component thereof (e.g., the locomotive engine 252 in FIGS. 2 and 4)

actuates one or more locomotive elements (e.g., joints, limbs, etc.) of the virtual in order to move the virtual agent to the selected subsequent location (e.g., the candidate subsequent location 832D).

Figure 8D:
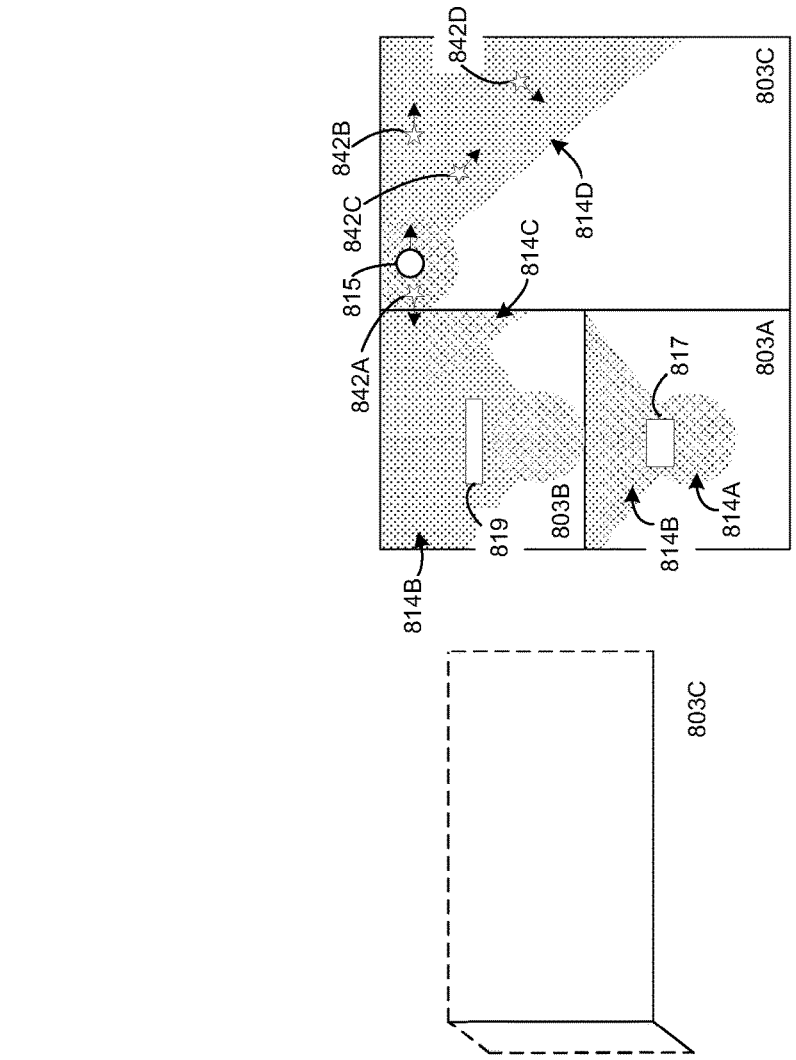
Figure 8D:
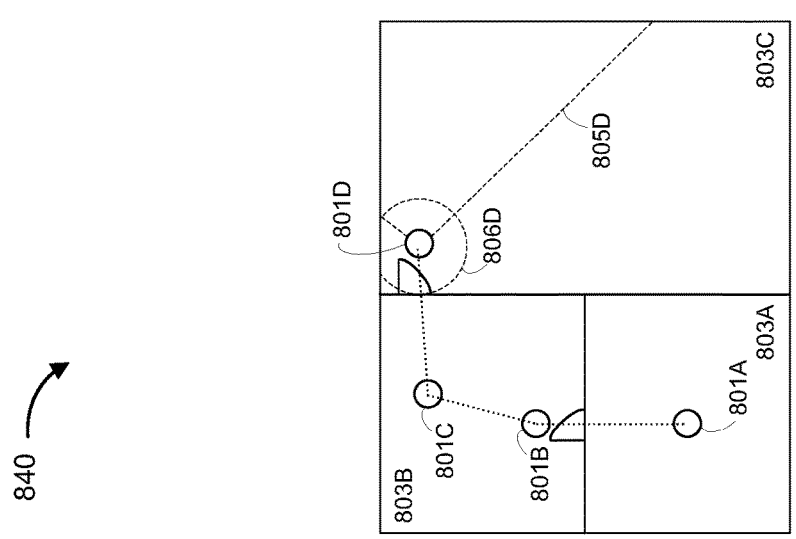

As shown in FIG. 8D, with reference to the instance 840 (e.g., associated with time T4), the third-person top-down plan view 802 includes a representation 801D of the virtual agent at a fourth location (e.g., the candidate subsequent location 832D) as well as a fourth representation of the viewing frustum 805D of the virtual agent relative to the fourth location and a fourth representation of the aural perception region 806D of the virtual agent relative to the fourth location. As shown in FIG. 8D, with reference to the instance 840 (e.g., associated with time T4), the first-person perspective view 811 includes blank walls.

As shown in FIG. 8D, with reference to the instance 840 (e.g., associated with time T4), the accumulated navigation mesh 808 includes the representation 815 of the virtual agent with a heading marker indicating that the virtual agent's field-of perception is pointed east, and a fourth portion 814D of a navigation mesh for the XR environment. As shown in FIG. 8D, the fourth portion 814D of the navigation mesh includes a conical sub-portion associated with the fourth representation of the viewing frustum 805C and a circular sub-portion associated with the fourth representation of the aural perception region 806D. According to some implementations, the VA OS engine 240 in FIG. 2 or a component thereof (e.g., the navigation mesh handler 248 in FIGS. 2 and 4) generates the fourth portion 814D of the navigation mesh for the XR environment based on the locomotive profile for the virtual agent and a fourth environmental information vector that characterizes the fourth representation of the viewing frustum 805D and the fourth representation of the aural perception region 806D.

As shown in FIG. 8D, with reference to the instance 840 (e.g., associated with time T4), the accumulated navigation mesh 808 also includes a plurality of candidate subsequent locations 842A, 842B, 842C, and 842D (sometimes collectively referred to herein as the "plurality of candidate subsequent locations 842") for the virtual agent. In FIG. 8D, each of the plurality of candidate subsequent locations 842 is associated with a heading marker.

In this example, with reference to FIG. 8C, the VA OS engine 240 in FIG. 2 or a component thereof (e.g., the decision engine 250 in FIGS. 2 and 4) determines the plurality of candidate subsequent locations 842 and determines that the target destination/objective has been reached. As such, the VA OS engine 240 in FIG. 2 or a component thereof forgoes selection of a subsequent location from among the plurality of candidate subsequent locations 842.

Figure 9:
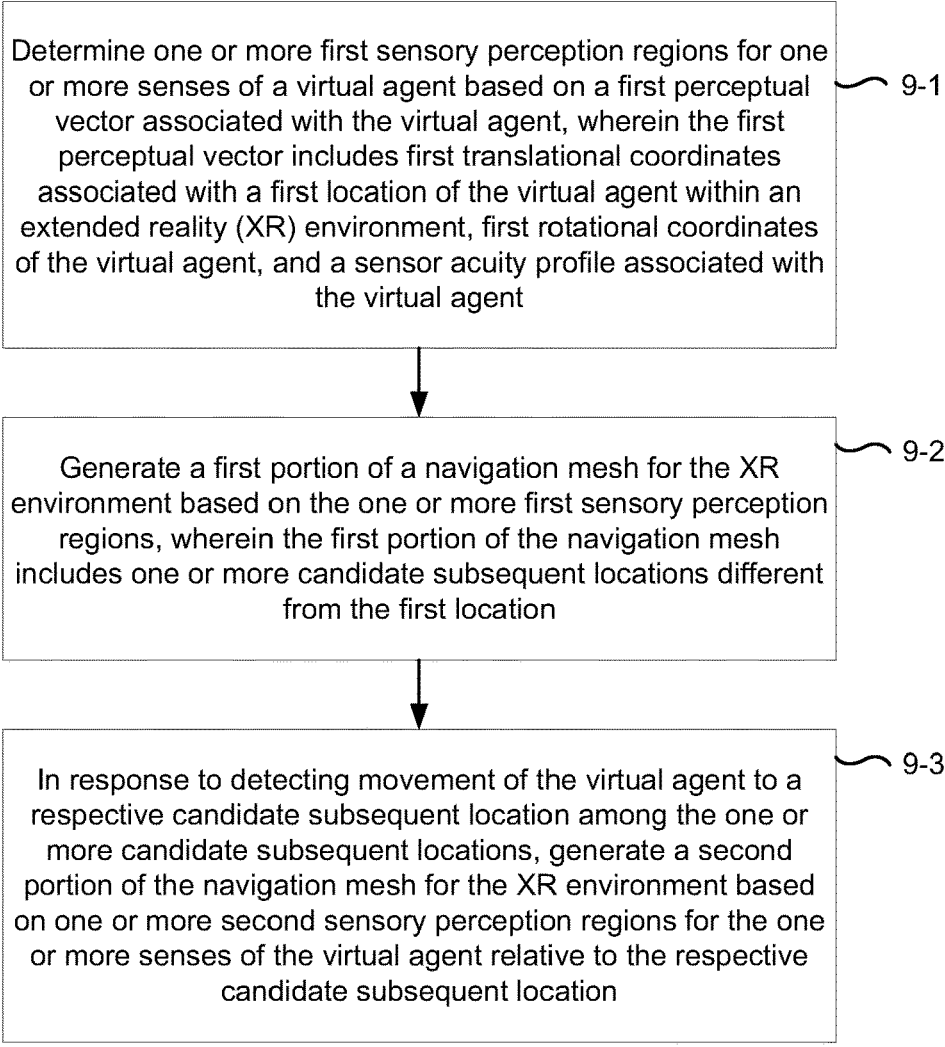
FIG. 9 is a flowchart representation of a method of navigation mesh exploration in accordance with some implementations.

FIG. 9 is a flowchart representation of a method 900 of navigation mesh exploration in accordance with some implementations. In various implementations, the method 900 is performed by a virtual agent operating system including non-transitory memory and one or more processors coupled with the non-transitory memory (e.g., the controller 110 in FIGS. 1 and 2; the electronic device 120 in FIGS. 1 and 3; or a suitable combination thereof), or a component thereof (e.g., the VA OS engine 240 in FIG. 2 or the navigation mesh exploration architecture 400 in FIG. 4). In some implementations, the method 900 is performed by processing logic, including hardware, firmware, software, or a combination thereof. In some implementations, the method 900 is performed by a processor executing code stored in a non-transitory computer-readable medium (e.g., a memory).

In various implementations, some operations in method 900 are, optionally, combined and/or the order of some operations is, optionally, changed.

As described above, in some instances, a search algorithm, such as A* or Dijkstra, is performed to plot a path through an environment from point A to point B based on a navigation mesh that characterizes the navigable area of the environment. However, this assumes that the virtual agent (or its orchestrator) has a priori knowledge of its environment in the form of a fully built navigation mesh. The embodiments described herein cover a method for exploring an unknown XR environment in order to build the navigation mesh based not on a random walk but on a Bayesian-esque approach constrained by the sensory perception of the virtual agent. As such, in other words the method described below enables a system to build a navigation mesh for the unknown XR environment.

As represented by block 9-1, the method 900 includes determining one or more first sensory perception regions (e.g., a first viewing frustum, a first aural perception region, a first olfactory perception region, and/or the like) for one or more senses (e.g., sight, hearing, smell, etc.) of a virtual agent based on a first perceptual vector associated with the virtual agent, wherein the first perceptual vector includes first translational coordinates associated with a first location of the virtual agent within an extended reality (XR) environment, first rotational coordinates of the virtual agent, and a sensory acuity profile associated with the virtual agent. In some implementations, the one or more first sensory perception regions includes at least one of a first viewing frustum, a first aural perception region, and a first olfactory perception region relative to the first location of the virtual agent within the XR environment.

In some implementations, with reference to FIG. 4, the VA OS or a component thereof (e.g., the sensor perception region generator 246 in FIGS. 2 and 4) determines the one or more sensory perception regions 406 based on the perceptual vector 404. An example perceptual vector 404 is described in more detail above with reference to FIG. 5A. Furthermore, FIG. 8A shows the third-person top-down plan view 802 with the representation 801A of the virtual agent at a first location (e.g., the origin) as well as the first representation of the viewing frustum 805A of the virtual agent relative to the first location and the first representation of the aural perception region 806A of the virtual agent relative to the first location.

In some implementations, the method 900 includes instantiating the virtual agent at the first location within the XR environment, wherein the first location corresponds to first translational coordinates within the XR environment. For example, a user instantiates the virtual agent into the XR environment at the origin by selecting the virtual agent from a set of available virtual agents and also selecting a location within the XR environment as the origin. As another example, the virtual agent operating system intelligently or pseudo-randomly selects the virtual agent from a set of available virtual agents and also selecting a location within the XR environment as the origin.

For example, with reference to FIGS. 8A-8B, the VA OS or a component thereof instantiates the virtual agent (e.g., associated with the representation 815) within the XR environment. Continuing with this example, as shown in FIGS. 8A-8D, the instances 810, 820, 830, and 840 (e.g., associated times T1, T2, T3, and T4, respectively) of the navigation mesh exploration scenario show a third-person top-down plan view 802 of the XR environment and the first-person perspective view 811 of the XR environment from the perspective of the virtual agent. In some implementations, the XR environment corresponds to a physical environment with or without overlaid XR content (e.g., skinned walls). In some implementations, the XR environment corresponds to a fully virtual environment. Thus, for example, the XR environment corresponds to a video game level with one or more VAs (e.g., non-player characters (NPCs)) instantiated therein. One of ordinary skill in the art will appreciate that the XR environment may take myriad forms.

In some implementations, the sensory acuity profile includes at least one of sensitivity or intensity values for the one or more senses of the virtual agent. An example sensory acuity profile 526 is described in more above below with reference to FIG. 5A.

In some implementations, the virtual agent corresponds to one of a humanoid, animal, or robot entity. As one example, the virtual agent corresponds to a bipedal humanoid or the like that is restricted by gravity and maintains contact with a planar surface of the XR environment such as the floor. For example, the virtual agent (e.g., associated with the representation 815) in FIGS. 8A-8D corresponds to a bipedal humanoid that maintains contact with the floor. As another example, the virtual agent corresponds to an entity, such as a spider, that is unrestricted (or partially restricted) by gravity and maintains contact with a planar surface of the XR environment such as the floor, walls, or ceiling. In some implementations, the virtual agent corresponds to any virtual entity, that is able to perceive the state of the XR environment and act upon or within the XR environment. As such, a virtual agent may be a fictious or stylized entity (e.g., a stylized golf ball character, an animatable teacup character a fictional Abraham Lincoln character, and/or the like).

As yet another example, the virtual agent corresponds to another entity, such as a flying insect, that is able to navigation the XR environment as a volumetric 3D space. Therefore, the virtual agent may be capable of 3D spatial reasoning and movement when the navigation mesh corresponds to a 3D volumetric region.

In some implementations, the XR environment corresponds to a multilevel structure with a first space and a second space connected by a discontinuous span. As one example, the discontinuous span corresponds to a stairway connecting two floors of a house (e.g., the 3D environment 710 in FIG. 7). For example, the XR environment corresponds to a video game level with one or more VAs (e.g., non-player characters (NPCs)) instantiated therein.

In some implementations, the XR environment corresponds to a multi-spatial structure with a first space and a second space connected by a door. For example, the XR environment in FIGS. 8A-8D includes a first room 803A, a second room 803B, and a third room 803C, where the door 807A that connects the first room 803A and the second room 803B and the door 807B that connects the second room 803B and the third room 803C.

As represented by block 9-2, the method 900 includes generating a first portion of a navigation mesh for the XR environment based on the one or more first sensory perception regions, wherein the first portion of the navigation mesh includes one or more candidate subsequent locations different from the first location. In some implementations, with reference to FIG. 4, the VA OS or a component thereof (e.g., the navigation mesh handler 248 in FIGS. 2 and 4) generates a navigation mesh (or a portion thereof) for the XR environment based on the locomotive profile for the VA and the environmental information vector 408 associated with the one or more sensory perception regions 406 by using one or more techniques known in the art such as local clearance triangulation, explicit corridor map, clearance disk graph, recast, NEOGEN, and/or the like. In some implementations, the navigation mesh (or the portions thereof) includes a plurality of cells such as triangles or convex polygons. In some implementations, each cell is associated with or encoded with metadata such as cell-specific clearance information, topography information, toxicity information, friction coefficient, and/or the like.

For example, with reference to FIG. 8A, the VA OS engine 240 in FIG. 2 or a component thereof (e.g., the navigation mesh handler 248 in FIGS. 2 and 4) generates the first portion 814A of the navigation mesh for the XR environment based on the locomotive profile for the virtual agent and a first environmental information vector that characterizes the first representation of the viewing frustum 805A and the first representation of the aural perception region 806A. For example, the representation 817 of the obstacle 804A corresponds to a hole within the first portion 814A of the navigation mesh for the XR environment.

In some implementations, with reference to FIG. 4, the VA OS 240 or a component thereof (e.g., the decision engine 250 in FIGS. 2 and 4) determines one or more candidate subsequent locations for the VA based on the current navigation mesh for the XR environment. For example, a candidate location may be within the first viewing frustum but not the first aural perception region or vice versa. For example, with reference to FIG. 8A, the VA OS engine 240 in FIG. 2 or a component thereof (e.g., the decision engine 250 in FIGS. 2 and 4) determines the plurality of candidate subsequent locations 812 and selects the candidate subsequent location 812D as the subsequent location for the virtual agent in order to explore the XR environment more quickly or build-out the navigation mesh for the XR environment.

In some implementations, the first portion of the navigation mesh includes a continuous planar surface. In some implementations, the continuous planar surface includes one or more holes associated with obstacles. For example, with reference to FIG. 8A, the first portion 814A of the navigation mesh for the XR environment includes a hole (e.g., indicated by the representation 817) for the obstacle 804A, wherein the first portion 814A of the navigation mesh for the XR environment corresponds to a continuous planar surface. In some implementations, the first portion of the navigation mesh corresponds to a three-dimensional volumetric region.

In some implementations, the method 900 includes obtaining a first environmental information vector associated with the one or more first sensory perception regions, wherein the first environmental information vector characterizes a first portion of the XR environment that corresponds to the one or more first sensory perception regions; and wherein the first portion of a navigation mesh for the XR environment is generated based on the first environmental information vector and a locomotive profile for the virtual agent. In some implementations, with reference to FIG. 4, the VA OS or a component thereof (e.g., environmental information collector 247 in FIGS. 2 and 4) obtains an environmental information vector 408 associated with the one or more sensory perception regions 406 that characterizes the XR environment from the current location of the virtual agent. An example environmental information vector 408 is described in more detail above with reference to FIG. 5A.

In response to detecting movement of the virtual agent to a respective candidate subsequent location among the one or more candidate subsequent locations, as represented by block 9-3, the method 900 includes generating a second portion of the navigation mesh for the XR environment based on one or more second sensory perception regions for the one or more senses (e.g., sight, hearing, smell, etc.) of the virtual agent relative to the respective candidate subsequent location.

In some implementations, the method 900 includes determining the one or more second sensory perception regions (e.g., a second viewing frustum, a second aural perception region, a second olfactory perception region, etc.) for the one or more senses of the virtual agent based on a second perceptual vector associated with the virtual agent, wherein the second perceptual vector includes the second translational coordinates associated with the respective candidate subsequent location, second rotational coordinates of the virtual agent, and the sensory acuity profile associated with the virtual agent. In some implementations, with reference to FIG. 4, the VA OS or a component thereof (e.g., the locomotive engine 252 in FIGS. 2 and 4) actuates one or more locomotive elements (e.g., joints, limbs, etc.) of the virtual agent based on a locomotive profile for the VA in order to move the virtual agent to the subsequent location 422 within the XR environment. Thereafter, continuing with this example, the VA OS obtains updated sensory information 402 by using the set of one or more senses to collect updated information regarding the current location of the virtual agent (e.g., the subsequent location 422) and the process continues.

In some implementations, the method 900 includes: selecting the respective candidate subsequent location among the one or more candidate subsequent locations according to predefined selection criteria; and actuating one or more locomotive elements of the virtual agent to move the virtual agent to the respective candidate subsequent location. For example, with reference to FIG. 8A, the VA OS engine 240 in FIG. 2 or a component thereof (e.g., the decision engine 250 in FIGS. 2 and 4) determines the plurality of candidate subsequent locations 812 and selects the candidate subsequent location 812D as the subsequent location for the virtual agent in order to explore the XR environment more quickly or build-out the navigation mesh for the XR environment.

In some implementations, the method 900 includes merging the first and second portions of the navigation mesh into a combined navigation mesh for the XR environment. In some implementations, the second portion is appended to the first portion. In some implementations, the second portion is merged with the first portion when the second portion at least partially overlaps the first portion.

In some implementations, the combined navigation mesh corresponds to a generic navigation mesh that is not tailored to the locomotive profile of the virtual agent. However, the combined navigation mesh may be limited by the perceptual vector for the virtual agent that characterizes the sensory acuity of the virtual agent. As such, according to some implementations, the combined navigation mesh may be used to generate a reconstruction of the XR environment.

In some implementations, the combined navigation mesh includes a continuous planar surface. For example, the continuous planar surface includes one or more holes associated with obstacles. For example, with reference to FIG. 8D, the accumulated navigation mesh 808 includes the portions 814A, 814B, 14C, and 814D (sometimes collectively referred to herein as the "navigation mesh portions 814"). In this example, the navigation mesh portions 814 form a continuous planar surface with holes (e.g., indicated by representations 817 and 819) for the obstacles 804A and 804B. In some implementations, the combined navigation mesh includes at least two perpendicular planar surfaces.

In some implementations, the predefined selection criteria correspond to an exploration criterion that will enable the virtual agent to uncover more of the navigation mesh for the XR environment based on the one or more senses of the virtual agent. In some implementations, the selection logic corresponds to a Bayesian choice instead of a random walk. As one example, the subsequent location is the selected in order to explore the XR environment more quickly or build-out the navigation mesh for the XR environment. As one example, the subsequent location is the selected in order to reach the target destination more quickly or achieve the objective.

In some implementations, the method 900 includes: identifying a first plurality of objects for the first portion of the navigation mesh; and assigning a first sub-label to the first portion of the navigation mesh based on the first plurality of objects identified therein. For example, the VA OS or a component thereof identifies the first plurality of objects within the first portion of the navigation mesh based on object recognition, semantic segmentation, and/or the like. For example, the first sub-label corresponds to a first space type identifier for the first portion of the navigation mesh such as kitchen, dining area, living room, bathroom, and/or the like. For example, the VA OS or a component thereof determines a probability value for each of a plurality of space types and selects the space type with the highest probability value as the first space type identifier. In this example, if the first plurality of objects includes a range, stovetop, sink, refrigerator, cooking utensils, etc., the probability value for the kitchen space type will have the highest probability values as compared to bathroom, garage, living room, or the like space types.

In some implementations, the method 900 includes: obtaining sub-labels for the portions of the combined navigation mesh; and assigning a macro-label to the combined navigation mesh based on the sub-labels for the portions of the combined navigation mesh. For example, the macro-label corresponds to a structure type identifier for the first combined navigation mesh such as apartment building, office space, retail/commercial store, single family home, and/or the like. For example, the VA OS or a component thereof determines a probability value for each of a plurality of structure types and selects the structure type with the highest probability value as the structure type identifier.

In some implementations, the first and second portions of the navigation mesh are determined based at least in part on a locomotive profile for the virtual agent that includes size characteristics for the virtual agent and movement characteristics for the virtual agent. According to some implementations, the locomotive profile 560 shown in FIG. 5B includes size characteristics for a particular VA (e.g., height, width, depth, radius, etc.) and movement characteristics for the virtual agent. (e.g., gait size, jump height, jump length, walk and run speed, etc.).

In some implementations, the method 900 further includes presenting the XR environment including the movements of the virtual agent. For example, the controller 110, the device 120, a suitable combination thereof, or component(s) thereof (e.g., the content manager 274 in FIG. 2) renders the XR environment including the movements and actions of the virtual agents. Continuing with this example, the controller 110, the device 120, a suitable combination thereof, or component(s) thereof (e.g., the presenter 344 in FIG. 3) presents the rendered XR environment via a display. In some implementations, the method

800 further includes modifying the target destination or objective of the virtual agent based on one or more user inputs.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is truer]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a virtual agent operating system including non-transitory memory and one or more processors coupled with the non-transitory memory:
        determining one or more first sensory perception regions for one or more senses of a virtual agent based on a first perceptual vector associated with the virtual agent, wherein the first perceptual vector includes first translational coordinates associated with a first location of the virtual agent within an extended reality (XR) environment, first rotational coordinates of the virtual agent, and a sensory acuity profile associated with the virtual agent;
        generating a first portion of a navigation mesh for the XR environment based on the one or more first sensory perception regions, wherein the first portion of the navigation mesh includes one or more candidate subsequent locations different from the first location;
        in response to detecting movement of the virtual agent to a respective candidate subsequent location among the one or more candidate subsequent locations, generating a second portion of the navigation mesh for the XR environment based on one or more second sensory perception regions for the one or more senses of the virtual agent relative to the respective candidate subsequent location; and
        adding the second portion of the navigation mesh for the XR environment to the first portion of a navigation mesh for the XR environment.

2. The method of claim 1, further comprising:
    obtaining a first environmental information vector associated with the one or more first sensory perception regions, wherein the first environmental information vector characterizes a first portion of the XR environment that corresponds to the one or more first sensory perception regions; and wherein the first portion of the navigation mesh for the XR environment is generated based on the first environmental information vector and a locomotive profile for the virtual agent.

3. The method of claim 1, further comprising:
    determining the one or more second sensory perception regions for the one or more senses of the virtual agent based on a second perceptual vector associated with the virtual agent, wherein the second perceptual vector includes the second translational coordinates associated with the respective candidate subsequent location, second rotational coordinates of the virtual agent, and the sensory acuity profile associated with the virtual agent.

4. The method of claim 3, further comprising:
    merging the first and second portions of the navigation mesh into a combined navigation mesh for the XR environment.

5. The method of claim 4, wherein the combined navigation mesh includes a continuous planar surface.

6. The method of claim 4, wherein the combined navigation mesh includes at least two perpendicular planar surfaces.

7. The method of claim 1, further comprising:
    selecting the respective candidate subsequent location among the one or more candidate subsequent locations according to predefined selection criteria; and
    actuating one or more locomotive elements of the virtual agent to move the virtual agent to the respective candidate subsequent location.

8. The method of claim 7, wherein the predefined selection criteria correspond to an exploration criterion that will enable the virtual agent to uncover more of the navigation mesh for the XR environment based on the one or more senses of the virtual agent.

9. The method of claim 1, wherein the first and second portions of the navigation mesh are determined based at least in part on a locomotive profile for the virtual agent that includes size characteristics for the virtual agent and movement characteristics for the virtual agent.

10. The method of claim 1, wherein the one or more first sensory perception regions includes at least one of a first viewing frustum, a first aural perception region, and a first olfactory perception region relative to the first location of the virtual agent within the XR environment.

11. The method of claim 1, wherein the sensory acuity profile includes at least one of sensitivity or intensity values for the one or more senses of the virtual agent.

12. The method of claim 1, wherein the virtual agent corresponds to one of a humanoid, animal, or robot entity.

13. The method of claim 1, wherein the virtual agent corresponds to a manned vehicle or an unmanned vehicle.

14. The method of claim 1, wherein the XR environment corresponds to a multilevel structure with a first space and a second space connected by a discontinuous span.

15. The method of claim 1, wherein the XR environment corresponds to a multi-spatial structure with a first space and a second space connected by a door.

16. The method of claim 1, wherein the first portion of the navigation mesh includes a continuous planar surface.

17. The method of claim 1, wherein the first portion of the navigation mesh corresponds to a three-dimensional volumetric region.

18. The method of claim 1, further comprising:
instantiating the virtual agent at the first location within the XR environment, wherein the first location corresponds to first translational coordinates within the XR environment.

19. A virtual agent operating system comprising:
one or more processors;
a non-transitory memory; and
one or more programs stored in the non-transitory memory, which, when executed by the one or more processors, cause the device to:
determine one or more first sensory perception regions for one or more senses of a virtual agent based on a first perceptual vector associated with the virtual agent, wherein the first perceptual vector includes first translational coordinates associated with a first location of the virtual agent within an extended reality (XR) environment, first rotational coordinates of the virtual agent, and a sensory acuity profile associated with the virtual agent;
generate a first portion of a navigation mesh for the XR environment based on the one or more first sensory perception regions, wherein the first portion of the navigation mesh includes one or more candidate subsequent locations different from the first location;
in response to detecting movement of the virtual agent to a respective candidate subsequent location among the one or more candidate subsequent locations, generate a second portion of the navigation mesh for the XR environment based on one or more second sensory perception regions for the one or more senses of the virtual agent relative to the respective candidate subsequent location; and
add the second portion of the navigation mesh for the XR environment to the first portion of a navigation mesh for the XR environment.

20. A non-transitory memory storing one or more programs, which, when executed by one or more processors of a virtual agent operating system, cause the virtual agent operating system to:
determine one or more first sensory perception regions for one or more senses of a virtual agent based on a first perceptual vector associated with the virtual agent, wherein the first perceptual vector includes first translational coordinates associated with a first location of the virtual agent within an extended reality (XR) environment, first rotational coordinates of the virtual agent, and a sensory acuity profile associated with the virtual agent;
generate a first portion of a navigation mesh for the XR environment based on the one or more first sensory perception regions, wherein the first portion of the navigation mesh includes one or more candidate subsequent locations different from the first location;
in response to detecting movement of the virtual agent to a respective candidate subsequent location among the one or more candidate subsequent locations, generate a second portion of the navigation mesh for the XR environment based on one or more second sensory perception regions for the one or more senses of the virtual agent relative to the respective candidate subsequent location; and
add the second portion of the navigation mesh for the XR environment to the first portion of a navigation mesh for the XR environment.

* * * * *